United States Patent
Ohtake

(10) Patent No.: US 7,554,744 B2
(45) Date of Patent: Jun. 30, 2009

(54) ZOOM LENS SYSTEM AND IMAGE-PICKUP APPARATUS

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 206 days.

(21) Appl. No.: 11/699,413

(22) Filed: Jan. 30, 2007

(65) Prior Publication Data

US 2007/0188887 A1    Aug. 16, 2007

(30) Foreign Application Priority Data

Feb. 10, 2006  (JP)  ............... 2006-033767

(51) Int. Cl.
  *G02B 15/14*  (2006.01)
  *G02B 27/64*  (2006.01)
(52) U.S. Cl. .................. 359/676; 359/557; 359/683
(58) Field of Classification Search .............. 359/676, 359/683
  See application file for complete search history.

(56) References Cited

U.S. PATENT DOCUMENTS

| | | | |
|---|---|---|---|
| 5,623,364 | A | 4/1997 | Morooka et al. |
| 7,190,520 | B2 * | 3/2007 | Misaka ................ 359/557 |
| 7,286,300 | B2 * | 10/2007 | Kuroda et al. ........... 359/693 |
| 7,312,934 | B2 * | 12/2007 | Iwasawa ............... 359/764 |

FOREIGN PATENT DOCUMENTS

| | | |
|---|---|---|
| JP | 05-224160 | 9/1993 |
| JP | 2001-228397 | 8/2001 |
| JP | 2004-252196 | 9/2004 |
| JP | 2005-128186 | 5/2005 |
| JP | 2005-215385 | 8/2005 |

OTHER PUBLICATIONS

European Search Report, for Application No. 07102029.1, dated Aug. 4, 2008.

* cited by examiner

*Primary Examiner*—Jordan M. Schwartz
(74) *Attorney, Agent, or Firm*—Rader Fishman & Grauer PLLC; Ronald P. Kananen

(57) ABSTRACT

A zoom lens system includes, in order from the object side, a first lens unit having positive refractive power, a second lens unit having negative refractive power, a third lens unit having positive refractive power, a fourth lens unit having positive refractive power, and a fifth lens unit. When the lens positions change from the wide-angle end to the telephoto end, at least the first to fourth lens units are movable in an optical axis direction. The fifth lens unit includes a negative subunit having negative refractive power and a positive subunit having positive refractive power and being disposed on the image side of the negative subunit with a predetermined air gap the negative subunit and the positive subunit, and is capable of shifting the image by shifting the positive subunit in a direction substantially orthogonal to the optical axis.

10 Claims, 28 Drawing Sheets

ZOOM LENS SYSTEM AND IMAGE-PICKUP APPARATUS

CROSS REFERENCES TO RELATED APPLICATIONS

The present invention contains subject matter related to Japanese Patent Application JP 2006-033767 filed in the Japanese Patent Office on Feb. 10, 2006, the entire contents of which are incorporated herein by reference.

BACKGROUND OF THE INVENTION

1. Field of the Invention

The present invention relates to a non-obvious zoom lens system and an image-pickup apparatus. More specifically, it relates to a zoom lens system capable of shifting an image by shifting part of a lens in a direction substantially orthogonal to the optical axis and relates to an image-pickup apparatus including the zoom lens system.

2. Description of the Related Art

There is a known recording method for a camera in which the light intensity of an image of an object that is formed on an image-pickup element surface by an image-pickup element using a photoelectric conversion element, such as a charge coupled device (CCD) or a complementary method-oxide semiconductor (CMOS), is converted into an electric output and is recorded.

Recently, the advancement in fine processing technology has lead to the increase in the speed of central processing units (CPUs) and the level of integration of recording media. Accordingly, high-speed processing of large volumes of image data that, in the past, could not have been processed has come possible. Furthermore, for light-receiving elements, increase in the level of integration and reduction of size has been carried out. Thus, the increase in the level of integration has enabled recording of higher spatial-frequency, and reduction in size has enabled a reduction in the overall size of a camera.

However, due to such increase in the level of integration and reduction in size, there is a problem in that the area of the light-receiving surface of each photoelectric conversion element is reduced, and the effect of noise increases as the magnitude of the electric output decreases. To prevent such problem, various measures, such as increasing the intensity of the light reaching the light-receiving elements is increases by employing a large focal ratio for the optical system and disposing lens elements (which are known as a microlens array) immediately before each element, has been taken. The microlens array guides light beams that pass through between adjacent elements but limits the exit pupil position of the lens system. When the exit pupil position of the lens system becomes closer to the light-receiving element, i.e., when the angle to the optical axis of the principal light beam incident on the light-receiving element increases, off-axis light beams emitted at the peripheral areas of the screen form a large angle to the optical axis. As a result, the light beams to not reach the light-receiving elements, and the intensity of light becomes insufficient.

Since the angle of view at the telephoto end in an optical system having large zoom ratio is small, there is a problem in that a very small level of shaking of the optical system generates a great level of shaking of the image.

As a shake-correction method of correcting the shaking of an image caused by the shaking of the optical system, an optical shake-correction system is known.

For an optical shake-correction system, a lens-shift method in which part of a lens system is shifted in a direction orthogonal to the optical axis or a variable apex-angle prism method in which the apex angle of a prism disposed immediately before a lens system is changed are known. However, for the variable apex-angle prism method, there is a problem that the size of the system including a driving system is large since the variable apex-angle prism is disposed on the object side of a first lens unit, which is the largest in the lens system.

The optical system of the lens system method can function as an optical shake-correction system for correcting shaking of an image caused by shaking of a camera by shifting lenses using a driving system by, for example, combing a detecting system for detecting shaking of the camera caused by shaking due to, for example, shutter release, a control system for obtaining, on the basis of a signal output from the detecting system, a correction value that is to be applied to the lens position, and a shift-driving system for driving the shifting of a lens on the basis of the output from the control system.

As the above-described lens shift method, for example, methods described in Japanese Unexamined Patent Application Publication Nos. 2005-215385, 2005-128186, and 2004-252196 are known.

The zoom lens system described in Japanese Unexamined Patent Application Publication No. 2005-215385 includes, in order from the object side, a first lens unit having positive refractive power, a second lens unit having negative refractive power, a third lens unit having positive refractive power, and a fourth lens unit having positive refractive power. The zoom lens system is configured in a manner such that, when the lens positions change from the wide-angle end to the telephoto end, the first lens unit moves toward the object, the second lens unit moves toward the image, the third lens unit once moves toward the object and then moves toward the image, and the fourth lens unit once moves toward the object and then moves toward the image. With the zoom lens system, an image is shifted by shifting the entire third lens unit in a direction substantially orthogonal to the optical axis.

The zoom lens system described in Japanese Unexamined Patent Application Publication No. 2005-128186 includes, in order from the object side, a first lens unit having positive refractive power, a second lens unit having negative refractive power, a third lens unit having positive refractive power, and a fourth lens unit having positive refractive power. The zoom lens system is configured in a manner such that, when the lens positions change from the wide-angle end to the telephoto end, the first lens unit and the third lens unit are fixed in the optical axis direction, the second lens unit moves toward the image, and the fourth lens unit moves so as to compensate for the displacement in the image plane position caused by the movement of the second lens unit. With the zoom lens system, an image is shifted by shifting the entire third lens unit in a direction substantially orthogonal to the optical axis.

The zoom lens system described in Japanese Unexamined Patent Application Publication No. 2004-252196 includes, in order from the object side, a first lens unit having positive refractive power, a second lens unit having negative refractive power, a third lens unit having positive refractive power, a fourth lens unit having positive refractive power, and a fifth lens unit having positive refractive power. The zoom lens system is configured in a manner such that, when the lens positions change from the wide-angle end to the telephoto end, the first to fourth lens units move so that the distance between the first lens unit and the second lens unit increases, the distance between the second lens unit and the third lens unit decreases, the distance between the third lens unit and the fourth lens unit increases, and the fifth lens unit is fixed in the optical axis direction. The third lens unit includes two subunits. With the zoom lens system, an image is shifted by shifting one of the subunits in a direction substantially orthogonal to the optical axis.

SUMMARY OF THE INVENTION

For such a known zoom lens system capable of shifting an image, there is a problem in that it is difficult to reduce the diameter of the lenses.

The zoom lens system according to Japanese Unexamined Patent Application Publication No. 2005-128186 shifts the image by shifting the third lens unit. However, since functions required for aberration correction are concentrated in the third lens unit, the diameter of the lenses cannot be sufficiently reduced. This is because, although the third lens unit has a great positive refractive power, it includes two subunits, i.e., a positive subunit and a negative subunit, for correcting distortion. To suppress the fluctuation in the various types of aberration generated during shifting, the diffusion effect by the negative subunit must be weakened. As a result, the diffusion effect of the second lens unit must be weakened, causing an increase in the lens diameter.

With the zoom lens system according to Japanese Unexamined Patent Application Publication No. 2005-215385, the aperture stop and the third lens unit are moved separately so as to reduce the diameter of the lenses. However, the number of driving mechanisms must be increased, causing the structure of the barrel to be complex and increasing the barrel diameter.

With the zoom lens system according to Japanese Unexamined Patent Application Publication No. 2004-252196, part of the third lens unit is shifted to shift the image. However, since the driving mechanism for the aperture stop and the driving mechanism for shifting the lenses are disposed close to each other in the optical axis direction, the barrel diameter is great and the clearance in the optical axis direction is great. Therefore, the size of the zoom lens system cannot be sufficiently reduced.

By taking into consideration the above-described problems, a zoom lens according to an embodiment of the present invention has a high magnification, is suitable for decreasing the lens diameter, and is capable of shifting an image.

A zoom lens system according to an embodiment of the present invention includes, in order from an object side, a first lens unit having positive refractive power, a second lens unit having negative refractive power, a third lens unit having positive refractive power, a fourth lens unit having positive refractive power, and a fifth lens unit. When the lens positions change from the wide-angle end to the telephoto end, at least the first to fourth lens units are movable in an optical axis direction, the second lens unit moves toward an image and the third lens unit moves toward the object so that the distance between the first lens unit and the second lens unit increases and the distance between the second lens unit and the third lens unit decreases, and the fourth lens moves in the optical axis direction to compensate for a displacement of an image plane due to the movement of the lens units. The fifth lens unit includes a negative subunit having negative refractive power and a positive subunit having positive refractive power and being disposed on the image side of the negative subunit with a predetermined air gap the negative subunit and the positive subunit, and is capable of shifting the image by shifting the positive subunit in a direction substantially orthogonal to the optical axis. An aperture is provided closer to the object than the fifth lens unit. The following Expression 1 is satisfied:

$$0.03 < \Delta S/ft < 0.15 \qquad (1)$$

where $\Delta S$ represents the movement from the aperture stop at the wide-angle end to the aperture stop at the telephoto end (in which the movement toward the object is positive), and ft represents the focal length at the telephoto end.

An image-pickup apparatus according to an embodiment of the present invention includes a zoom lens system according to an embodiment of the present invention.

The zooms lens system according to an embodiment of the present invention has high magnification, is suitable for reducing the diameter of lenses, and is capable of shifting an image.

BRIEF DESCRIPTION OF THE DRAWINGS

FIG. 3 illustrates spherical aberration, astigmatism, distortion, and lateral aberration at the wide-angle end.

FIG. 10 illustrates spherical aberration, astigmatism, distortion, and lateral aberration at the wide-angle end.

FIG. 17 illustrates spherical aberration, astigmatism, distortion, and lateral aberration at the wide-angle end.

FIG. 24 illustrates a state in which the camera is not shaking.

DESCRIPTION OF THE PREFERRED EMBODIMENTS

Figure 1:
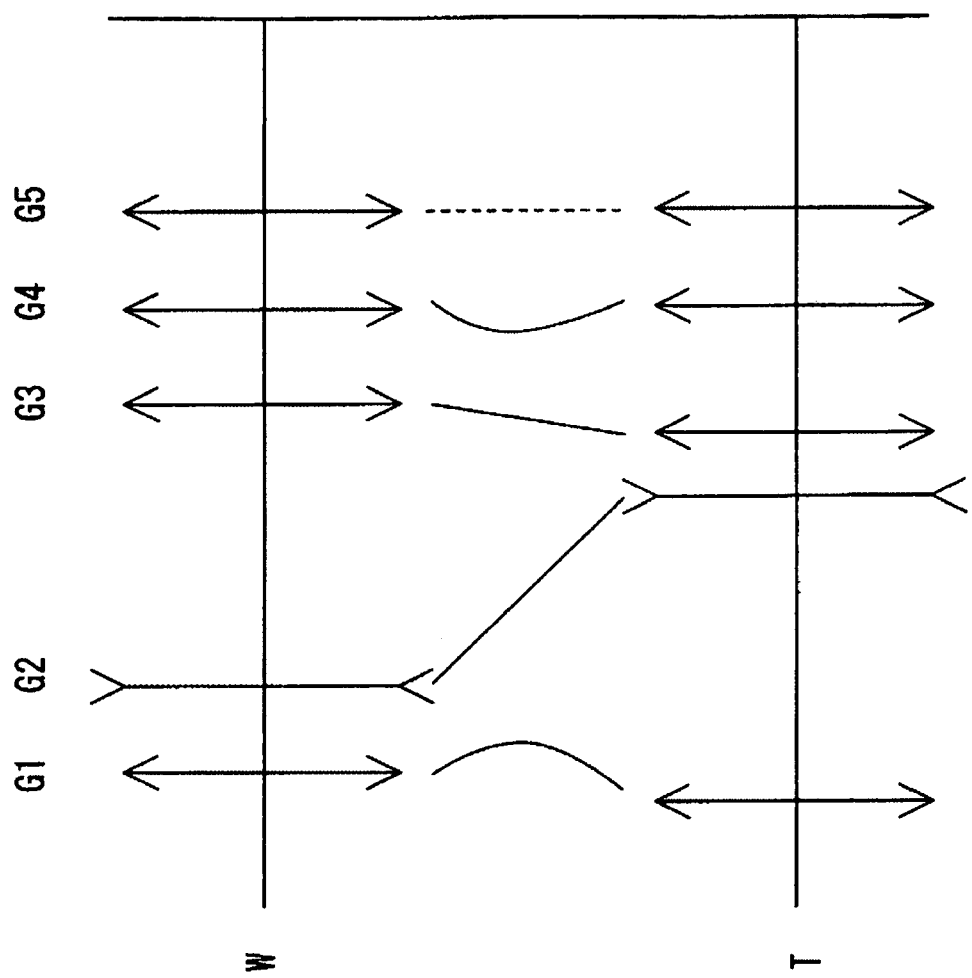
FIG. 1 illustrates the positioning of refractive power in a zoom lens system according to an embodiment of the present invention.

A zoom lens system and an image-pickup apparatus according to embodiments of the present invention will be described below with reference to the drawings and tables.

A zoom lens system according to an embodiment of the present invention may employ configurations 1 to 6 as described below.

1. A zoom lens system that includes, from the object side, a first lens unit having positive refractive power, a second having negative refractive power, a third unit having positive refractive power, a fourth lens unit having positive refractive power, and a fifth lens unit. When the lens positions change from the wide-angle end to the telephoto end, at least the lenses of the first to fourth lens units are movable in the optical axis direction; the second lens unit moves to the image side so that the distance between the first lens unit and the second lens unit increases and the distance between the second lens unit and the third lens unit decreases; the third lens unit moves toward the object; the fourth lens moves in the optical axis direction to compensate for the displacement of the image plane due to the movement of the lens units; the fifth lens unit includes a negative subunit having negative refractive power and a positive subunit having positive refractive power and being disposed on the image side of the negative subunit with a predetermined air gap provided therebetween. An image can be shifted by shifting the positive subunit in a direction substantially orthogonal to the optical axis. An aperture stop is provided closer to the object than the fifth lens unit is. The following Expression 1 is satisfied:

$$0.03 < \Delta S/ft < 0.15 \quad (1)$$

where ΔS represents the movement from the aperture stop at the wide-angle end to the aperture stop at the telephoto end (in which the movement toward the object is positive), and ft represents the focal length at the telephoto end.

2. A zoom lens system that satisfies the following Expression 2:

$$-1 < (Ra+Rb)/(Ra-Rb) < -0.35 \quad (2)$$

where Ra represents the radius of curvature of the surface of a lens of the positive subunit disposed in the fifth lens unit that is closest to the object, and Rb represents the radius of curvature of the surface of a lens of the positive subunit disposed in the fifth lens unit that is closest to the image.

3. A zoom lens system that has an aperture stop provided in the vicinity of the third lens unit and that satisfies the following Expression 3:

$$0.3 < D_{sw}/TL_w < 0.4 \quad (3)$$

where $D_{sw}$ represents the distance from the aperture stop to the image plane at the telephoto end, and $TL_w$ represents the entire length of the lens system at the telephoto end.

4. A zoom lens system wherein the aperture stop moves together with the third lens unit when the lens positions change.

5. A zoom lens system wherein the fifth lens unit is fixed in the optical axis direction.

6. A zoom lens system that satisfies the following Expression 4:

$$0.8 < |f5n|/Dn < 1.3 \quad (4)$$

where f5n represent the focal length of the negative subunit disposed in the fifth lens unit, and Dn represents the distance from the surface of a lens of the positive subunit disposed in the fifth lens unit that is closest to the image.

An image-pickup apparatus according to an embodiment of the present invention may employ configurations 1 to 3 as described below.

1. An image-pickup apparatus including a zoom lens system and an image-pickup element configured to convert an optical image formed by the zoom lens system into an electric signal. The zoom lens system includes, from the object side, a first lens unit having positive refractive power, a second having negative refractive power, a third unit having positive refractive power, a fourth lens unit having positive refractive power, and a fifth lens unit. When the lens positions change from the wide-angle end to the telephoto end, at least the lenses of the first to fourth lens units are movable in the optical axis direction; the second lens unit moves to the image side so that the distance between the first lens unit and the second lens unit increases and the distance between the second lens unit and the third lens unit decreases; the third lens unit moves to the object side; the fourth lens moves in the optical axis direction to compensate for the displacement of the image plane due to the movement of the lens units; the fifth lens unit includes a negative subunit that has negative refractive power and a positive subunit that has positive refractive power and that is disposed on the image side of the negative subunit with a predetermined air gap provided therebetween. An image can be shifted by shifting the positive subunit in a direction substantially orthogonal to the optical axis. An aperture stop is provided closer to the object than the fifth lens unit is. The following Expression 1 is satisfied:

$$0.03 < \Delta S/ft < 0.15 \quad (1)$$

where ΔS represents the movement from the aperture stop at the wide-angle end to the aperture stop at the telephoto end (in which the movement toward the object is positive), and ft represents the focal length at the telephoto end.

2. The zoom lens system that satisfies the following Expression 2:

$$-1 < (Ra+Rb)/(Ra-Rb) < -0.35 \quad (2)$$

where Ra represents the radius of curvature of the surface of a lens of the positive subunit disposed in the fifth lens unit that is closest to the object, and Rb represents the radius of curvature of the surface of a lens of the positive subunit disposed in the fifth lens unit that is closest to the image.

3. The image-pickup apparatus that includes a shake detecting unit for detecting shaking of the image-pickup element, a shake control unit for calculating a shake-correction angle for correcting image shaking caused by the shaking of an the image-pickup element detected by the shake detecting unit and sending a correction signal for shifting the positive subunit in the fifth lens unit of the zoom lens system in a direction substantially orthogonal to the optical direction by an amount corresponding to the shake-correction angle, and a shake driving unit for shifting the positive subunit in a direction substantially orthogonal to the optical axis.

Next, a zoom lens system according to an embodiment of the present invention will be described in more detail.

A zoom lens system according to an embodiment of the present invention includes, in order from the object side, a first lens unit having positive refractive power, a second lens unit having negative refractive power, a third lens unit having positive refractive power, a fourth lens unit having positive refractive power, and a fifth lens unit. When the lens position changes from the wide-angle end where the focal length is the smallest to the telephoto end where the focal length is the greatest, at least the first to fourth lens units are movable. The second lens unit moves toward the image and the third lens unit moves toward the object so that the distance between the first lens unit and the second lens unit increases and the distance between the second lens unit and the third lens unit decreases, and the fourth lens units moves in the optical axis direction so as to compensate for the displacement of the image plane caused by the movement of the lens units. The fifth lens unit includes a negative subunit having negative refractive power and a positive subunit having positive refractive power and being disposed on the image side of the negative lens unit with an air gap provided therebetween. By shifting the positive subunit in a direction substantially orthogonal to the optical axis, the image can be shifted. Moreover, an aperture stop is provided closer to the object than the fifth lens unit is, and the following Expression 1 is satisfied:

$$0.03 < \Delta S/ft < 0.15 \quad (1)$$

where ΔS represents the movement from the aperture stop at the wide-angle end to the aperture stop at the telephoto end (in which the movement toward the object is positive), and ft represents the focal length at the telephoto end.

A zoom lens system according to an embodiment of the present invention is capable of achieving both high magnification and high performance by employing the following two points:

1) The fifth lens unit includes a negative subunit having negative refractive power and a positive subunit having positive refractive power; and 2) The aperture stop is provided at a suitable position.

A known zoom lens system has a problem in that functions for correcting aberration are concentrated on the third lens unit.

Thus, with a zoom lens system according to an embodiment of the present invention, the fifth lens unit is disposed on the image side of the fourth lens unit so as to simplify the lens configuration of the third lens unit. In this way, high magnification and high performance are both achieved.

First, the structure of the fifth lens unit will be described.

In general, there is a tendency in that the closer an off-axis light beam is to end of an optical system (on the object or image side), the further the off-axis light beam deviates from the optical axis.

By focusing attention to this tendency, the zoom lens system according to an embodiment of the present invention reduces the burden placed on the third lens unit for aberration correction by disposing the fifth lens unit on the image side of the fourth lens unit. In a zoom lens system according to an embodiment of the present invention, the fifth lens unit includes a negative subunit having negative refractive power and a positive subunit having positive refractive power and being disposed on the image side of the negative subunit. In this way, the burden placed on the third lens unit for aberration correction is reduced, and both high magnification and stable optical quality obtained at production are achieved.

The fifth lens unit of a zoom lens system according to an embodiment of the present invention has two functions.

The first function is a function for adjusting the exit pupil position. By disposing the negative subunit having negative refractive power and a positive subunit having positive refractive power on the image side of the negative subunit with an air gap provided therebetween, the exit pupil position is moved away from the image plane, i.e., a principal light beam can be moved to the image plane in a state substantially parallel to the optical axis.

The second function is a function for correcting distortion. By disposing the negative subunit having negative refractive power so that its lens surface on the image side faces an intense concave surface to the image, negative distortion that easily occurs at the telephoto end can be corrected in an excellent manner.

As a result, with a zoom lens system according to an embodiment of the present invention, the flexibility of the exit pupil position in a lens system that is disposed on the object side of the fifth lens unit increases, and, in particular, the flexibility in the design of the angle of the principal light beam that is emitted from the third lens unit to the optical axis increases. Furthermore, since correction of negative distortion does not have to be carried out by the third lens unit, the third lens unit can be configured of only positive subunits. Accordingly, the structure of the third lens unit can be simplified.

Since the third lens unit does not have to be shifted in a direction orthogonal to the optical axis, the refractive power of the second lens unit can be increased, and the off-axis light beam passing through the first lens unit moves closer to the optical axis. In this way, the lens diameter can be reduced.

When shifting an image by shifting the positive subunit, it is important to satisfactorily correct the fluctuation in the distortion that is generated when shifting an image since the positive subunit is disposed away from the aperture stop.

The fluctuation in the distortion that is generated when shifting an image can be satisfactorily corrected by applying the fact that the exit pupil position can be adjusted by configuring the fifth lens unit of the zoom lens system according to an embodiment of the present invention with a negative subunit and a positive subunit, as described above.

Details are illustrated in FIGS. 24 to 27.

Figure 24:
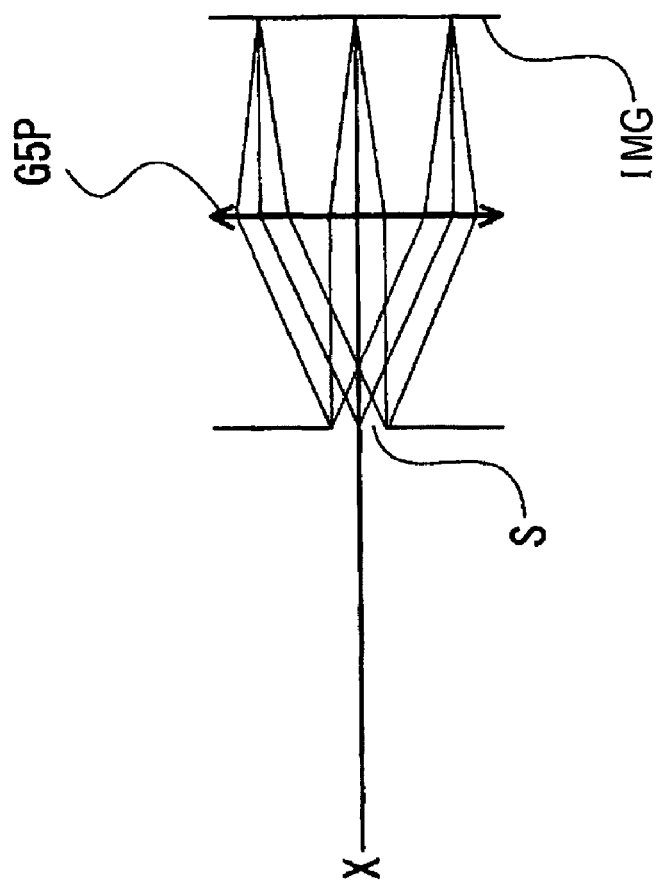
FIG. 24, together with FIGS. 25 to 27, illustrates shaking and correction thereof by a light trajectory.
Figure 25:
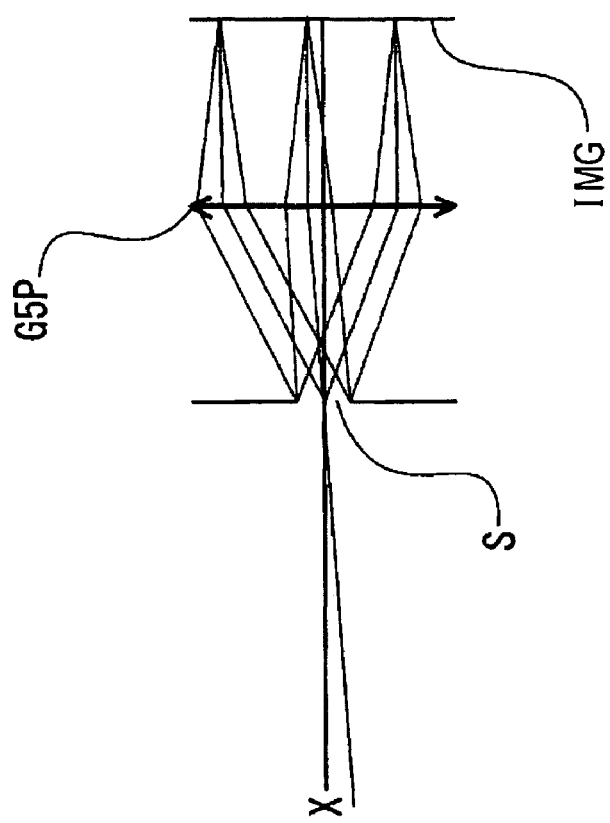
FIG. 25 illustrates a state in which the camera is shaking a the light trajectory is displaced from the optical axis, i.e., a state in which image shaking is occurring.
Figure 26:
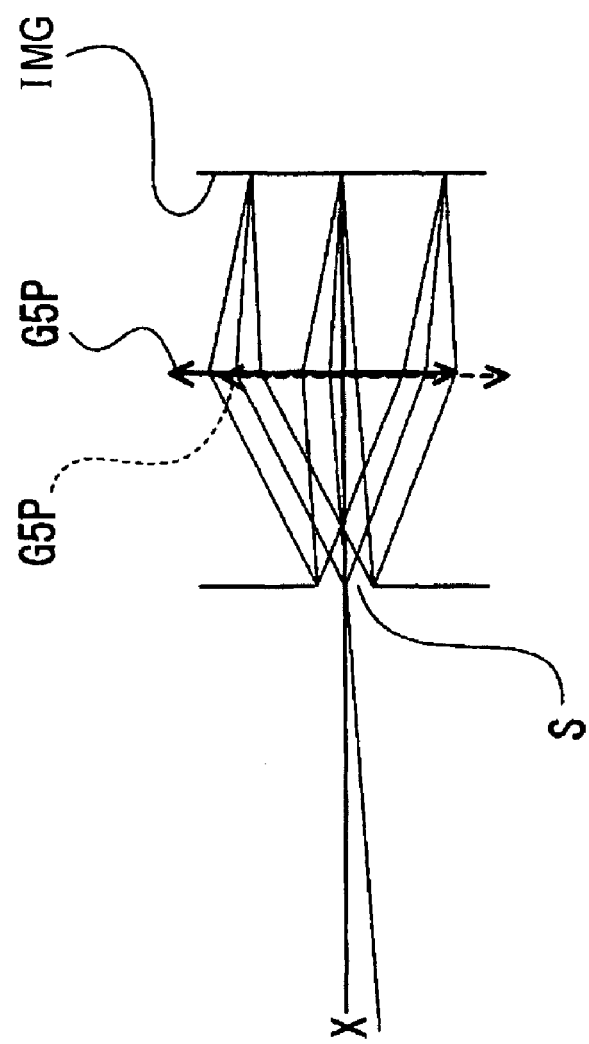
FIG. 26 illustrates a state in which an image is shifted by shifting a positive subunit of the fifth lens unit.
Figure 27:
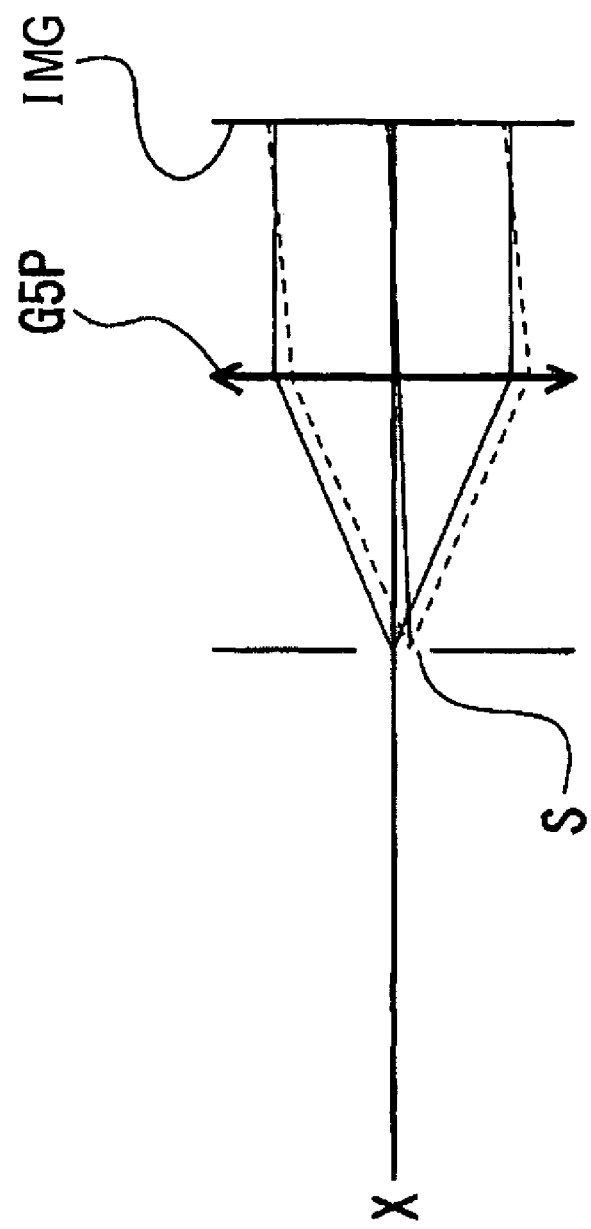
FIG. 27 illustrates a principal light beam (solid line) in a state in which the camera is not shaking and a principal light beam (dotted line) in a state in which the shaking of the camera is corrected.

FIG. 24 illustrates an optical path when the exit pupil is positioned at infinity and when the camera is not shaken. In FIGS. 24 to 27, G5p represents the positive subunit of the fifth lens unit, x represents the optical axis, S represents the aperture stop, and IMG represents the image plane. The camera is actually slightly shaken, but in FIGS. 24 to 27, the shaking is enhanced to a greater magnitude than the actual shaking so that it is visible. FIG. 25 illustrates the optical path in FIG. 24 when shaking of the camera causes the incident angle to the optical system to be displaced. FIG. 26 illustrates the optical path when the positive subunit G5p, in the state shown in FIG. 25, is shifted (the positive subunit G5p before shifting is represented by a solid line and after shifting is represented by a dotted line). FIG. 27 illustrates the principal light beam (solid line) when the camera is not shaken and the principal light beam (dotted line) when the shaking of the camera is corrected.

As shown in FIG. 27, when the exit pupil position moves away from the image plane, i.e., when the principal light beam emitted from the lens system is substantially parallel to the optical axis, the fluctuation in distortion generated when shifting an image can be satisfactorily corrected if the spherical aberration generated uniquely at the positive subunit and the coma aberration generated when the image height is minute can be satisfactorily corrected. There is a known sine condition that can be used as a rough guide for correcting the coma aberration generated when the image height is minute.

With the zoom lens system according to an embodiment of the present invention, the positive subunit is configured of one positive lens and one negative lens, and the spherical aberration and the sine condition are corrected simultaneously. In this way, distortion generated during shifting can be satisfactorily corrected.

The position of the aperture stop is extremely important when determining the exit pupil position.

As described above, with the zoom lens system according to an embodiment of the present invention, it is desirable to approximate the exit pupil position to infinity regardless of the lens positions so as to satisfactorily correct the fluctuation in distortion generated when the positive subunit is shifted. To suppress the displacement in the exit pupil position, it is effective to reduce the moving of the aperture stop in the optical axis direction when the lens positions change.

However, to satisfactorily correct off-axis aberration that is generated when the lens positions change from the wide-angle end to the telephoto end, it is desirable to move the aperture stop. By moving the aperture stop, the height of the off-axis light beam that passes through each lens unit can be actively changed, and high magnitude and high performance can be achieved.

With the zoom lens system according to an embodiment of the present invention, fluctuation in the distortion generated when shifting an image is suppressed and high magnitude and high performance are achieved by moving the aperture stop by a suitable distance when the lens positions change from the wide-angle end to the telephoto end.

By focusing attention to the above-described two points, the zoom lens system according to an embodiment of the present invention is capable shift an image, and both high magnitude and high performance are achieved.

As described above, the zoom lens system according to an embodiment of the present invention satisfies Expression 1. Expression 1 is presented again below:

$$0.03 < \Delta S/ft < 0.15 \quad (1)$$

where $\Delta S$ represents the movement from the aperture stop at the wide-angle end to the aperture stop at the telephoto end (in which the movement toward the object is positive), and ft represents the focal length at the telephoto end.

Expression 1 defines the amount of movement of the aperture stop when the lens positions change from the wide-angle end to the telephoto end.

When the upper limit of Expression 1 is exceeded, the change in the exit pupil position generated together with the change in the lens positions becomes great, and fluctuation in the distortion generated when shifting an image increases.

When the upper limited of Expression 1 is not exceeded, it is difficult to satisfactorily correct the fluctuation in the off-axis aberration generated together with the change in the lens positions. Thus, it is difficult to achieve either high magnitude or high performance.

With the zoom lens system according to an embodiment of the present invention, it is desirable to satisfy the following Expression 2 so as to satisfactorily correct the spherical aberration and the sine condition for achieving higher performance.

$$-1 < (Ra+Rb)/(Ra-Rb) < -0.35$$

where Ra represents the radius of curvature of the surface of a lens of the positive subunit disposed in the fifth lens unit that is closest to the object, and Rb represents the radius of curvature of the surface of a lens of the positive subunit disposed in the fifth lens unit that is closest to the image.

Expression 2 defines the bending shape of the positive subunit disposed in the fifth lens unit.

When the upper limit of Expression 2 is exceeded (i.e., when the radius of curvature of the image side lens becomes small) or when the lower limit is not reached (i.e., when the radius of curvature of the image side lens becomes great), the fluctuation in the distortion generated when the positive subunit is shifted becomes great.

With the zoom lens system according to an embodiment of the present invention, it is desirable to dispose the aperture stop in the vicinity of the third lens unit so as to maintain the balance between a small lens diameter and high performance.

With the zoom lens system according to an embodiment of the present invention, the off-axis light beam passing through the third lens unit moves closer to the optical axis by disposing the aperture stop in the vicinity of the third lens unit. Therefore, the aberration correction function of the third lens unit can be used mainly for correcting the axial chromatic aberration, and high performance can be achieved.

With the zoom lens system according to an embodiment of the present invention, when the lens positions change from the wide-angle end to the telephoto end, the off-axis light beam passing through the second lens unit moves closer to the optical axis and the off-axis light beam passing through the first lens unit and the fourth lens unit changes by disposing the aperture stop in the vicinity of the third lens unit. As a result, when the lens positions change, the height of the off-axis light beam passing through the lens units change. Thus, the flexibility in aberration correction increases and high performance can be achieved.

With the zoom lens system according to an embodiment of the present invention, both a reduced lens diameter and high performance can be achieved by satisfying the following Expression 3:

$$0.3 < D_{sw}/TL_w < 0.4 \quad (3)$$

where $D_{sw}$ represents the distance from the aperture stop to the image plane at the telephoto end, and $TL_w$ represents the entire length of the lens system at the telephoto end.

Expression 3 defines the aperture stop position at the wide-angle end.

When the lower limit of Expression 3 is not reached, since the position of the aperture stop at the wide-angle end moves toward the image plane, the off-axis light beam that passes through the first lens unit deviates from the optical axis. Therefore, the lens diameter cannot be further reduced.

In contrast, when the upper limit of Expression 3 is exceeded, since the distance between the aperture stop and the second lens unit is reduced, the refractive power of the second lens unit becomes too strong. As a result, it becomes difficult to satisfactorily correct the fluctuation of coma aberration generated together with the change in the angle of view, and it is difficult to achieve higher performance.

With the zoom lens system according to an embodiment of the present invention, by moving the aperture stop together with the third lens unit, the structure of the lens barrel can be simplified.

With the zoom lens system according to an embodiment of the present invention, to reduce the number of movable lens units and simplify the structure of the lens barrel, it is desirable to fix the fifth lens unit in the optical axis direction, regardless of the lens positions.

With the zoom lens system according to an embodiment of the present invention, it is desirable to satisfy the following Expression 4 so as to achieve higher performance.

$$0.8 < |f5n|/Dn < 1.3 \quad (4)$$

where f5n represent the focal length of the negative subunit disposed in the fifth lens unit, and Dn represents the distance from the surface of a lens of the positive subunit disposed in the fifth lens unit that is closest to the image.

Expression 4 defines the focal length of the fifth lens unit.

Figure 23:
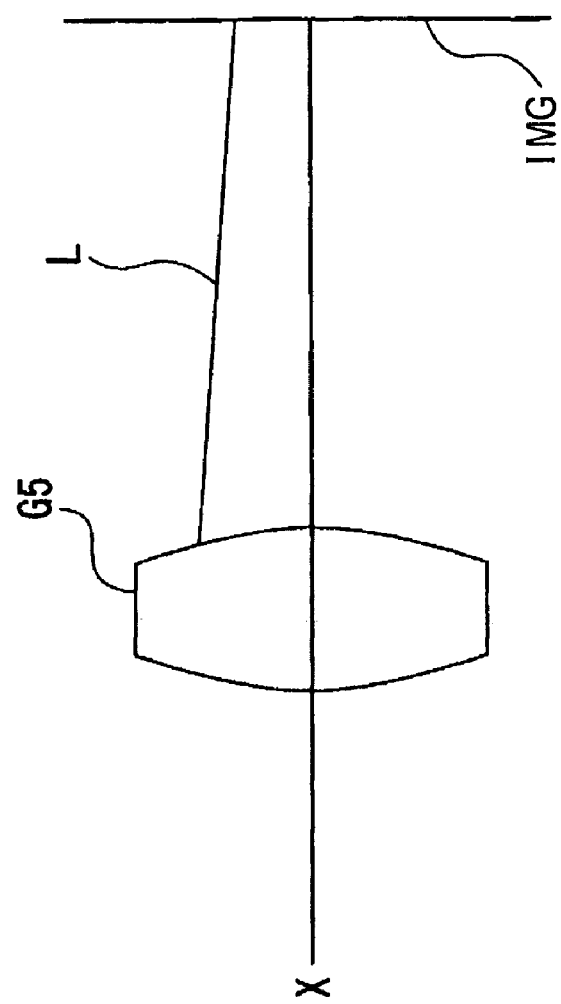
FIG. 23 illustrates the light trajectory of a principal beam transmitted through a fifth lens unit when the exit pupil position is positive.

When the lower limit of Expression 4 is not reached, the exit pupil position is a positive (+) value since the light beam is intensely diffused by the negative subunit disposed in the fifth lens unit. More specifically, as shown in FIG. 23, since a principal light beam L that is transmitted through the fifth lens unit G5 and reaches the image plane IMG moves close to the optical axis x, the off-axis light beam that is transmitted through the fifth lens unit G5 moves away from the optical axis. Thus, it becomes difficult to satisfactorily correct the coma aberration generated on the screen and its vicinity. When the upper limit of Expression 4 is exceeded, it becomes difficult to satisfactorily correct the negative distortion generated at the wide-angle end.

With the zoom lens system according to an embodiment of the present invention, to achieve higher performance, it is desirable that the first lens unit be configured of three lenses, i.e., a cemented lens of a negative lens and a positive lens and one positive lens, that are disposed in order from the object side.

Since an on-axis light beam at the telephoto end enters the first lens unit with large beam diameter, negative spherical aberration is easily generated. Since an off-axis light beam enters the first lens unit away from the optical axis, off-axis aberration is easily generated.

With the zoom lens system according to an embodiment of the present invention, by disposing a cemented lens of a negative lens and a positive lens in the first lens unit at a position closest to the object, the negative spherical aberration and the axial chromatic aberration are satisfactorily corrected. The positive lens disposed on the image side of the cemented lens mainly and satisfactorily corrects the fluctuation in coma aberration generated together with the change in the angle of view. By clearly defining the function of each lens, high optical performance can be achieved.

With the zoom lens system according to an embodiment of the present invention, to satisfactorily correct various types of aberration generated the second lens unit and achieve high optical performance, it is desirable to configure the second lens unit with three lenses, i.e., a negative meniscus lens having a concave surface facing the image, a negative lens, and a positive lens, disposed in order from the object side.

Since the second lens unit carries out magnification, it is important to satisfactorily correct various types of aberration generated at the second lens unit to achieve higher performance. With the zoom lens system according to an embodiment of the present invention, a negative meniscus lens having a concave surface facing the image and being disposed closest to the object in the second lens unit corrects the fluctuation in the coma aberration generated together with the change in the view of angle at the wide-angle end, and a doublet lens disposed on the image side of the meniscus negative lens satisfactorily corrects axial aberration. In this way, the functions of the lenses are clarified for aberration correction, and excellent image-forming performance is achieved.

With the zoom lens system according to an embodiment of the present invention, to satisfactorily correct the fluctuation in various types of aberration generated together with the change in the position of the object, it is desirable that the fourth lens unit be configured with a positive lens having a convex surface facing the object and a negative lens having a concave surface facing the image, the lens being disposed in this order from the object side.

By employing a doublet structure, the off-axis aberration and the axial aberration can be corrected simultaneously. Thus, the fluctuation in the various type of aberration generated when the position of the object is changed can be satisfactorily corrected.

With the zoom lens system according to an embodiment of the present invention, to satisfactorily suppress the generation of chromatic aberration, it is desirable to use glass having intense extra-low diffusion for the first lens unit. In particular, by producing a positive lens of a cemented lens included in the first lens unit with glass having intense extra-low diffusion, secondary diffusion at the central area of the screen at the telephoto end can be satisfactorily corrected.

With the zoom lens system according to an embodiment of the present invention, the positive subunit disposed in the fifth lens unit is configured of one positive lens and one negative lens. By forming an aspherical surface one of the surfaces of each lens, the positive lens and the negative lens can form a cemented lens. By forming a cemented lens, the structure of the lens barrel can be simplified, and the fluctuation in the various types of aberration generated during production can be satisfactorily suppressed.

It is also possible to configure the negative subunit and the positive subunit disposed in the fifth lens unit with many lenses so as to achieve higher performance. The positive subunit can be driven in a direction substantially orthogonal to the optical axis direction. Since the weight increases as the number of lenses increase, the driving mechanism becomes complex and power consumption increases.

With the zoom lens system according to an embodiment of the present invention, by using an aspherical lens, high optical performance can be achieved. In particular, by introducing an aspherical lens in the fifth lens unit, the central performance can be further improved. By using an aspherical lens in the second lens unit, the fluctuation in the coma aberration due to the field of angle at the telephoto end can be satisfactorily corrected.

Furthermore, by using a plurality of aspherical lenses, higher optical performance can be achieved.

It is also possible to provide a low-pass filter for preventing the generation of moire stripes on the image side of the lens system and infrared cut filters in accordance with the spectral sensitivity of the light-receiving element.

Next, numerical examples corresponding to specific numerical values employed by a zoom lens system according to embodiments of the present invention will be described will be described with reference to FIGS. 1 to 22 and Tables 1 to 12.

The shape of the aspherical surface employed by each numerical example is represented by the following Expression 5:

$$X = cy^2/(1+(1-(1+\kappa)c^2y^2)^{1/2}) + Ay^4 + By^6 + \quad (5)$$

Where y represents the height from the optical axis, x represents the amount of sag, c represents the curvature, κ represents the cone constant, and A and B represent the aspherical surface coefficients.

FIG. 1 illustrates the allocation of the refractive power of the zoom lens system according to an embodiment of the present invention. The zoom lens system includes, in order from the object side, a first lens unit G1 having positive refractive power, a second lens unit G2 having negative refractive power, a third lens unit G3 having positive refractive power, a fourth lens unit G4 having positive refractive power, and a fifth lens unit G5 having positive refractive power. When magnification is carried out from the wide-angle end to the telephoto end, the first to fourth lens units G1 to G4 move so that the air gap between the first lens unit G1 and the second lens unit G2 increases and the air gap between the second lens unit G2 and the third lens unit G3 decreases. At this time, the first lens unit G1 once moves toward the image and then moves to the object; the second lens unit G2 moves toward the image; the third lens unit G3 moves toward the object; and the fifth lens unit G5 is fixed. The fourth lens unit G4 moves so as to correct the displacement in the image place position caused by the movement of the lens units and moves toward the object during close-distance focusing.

Figure 2:
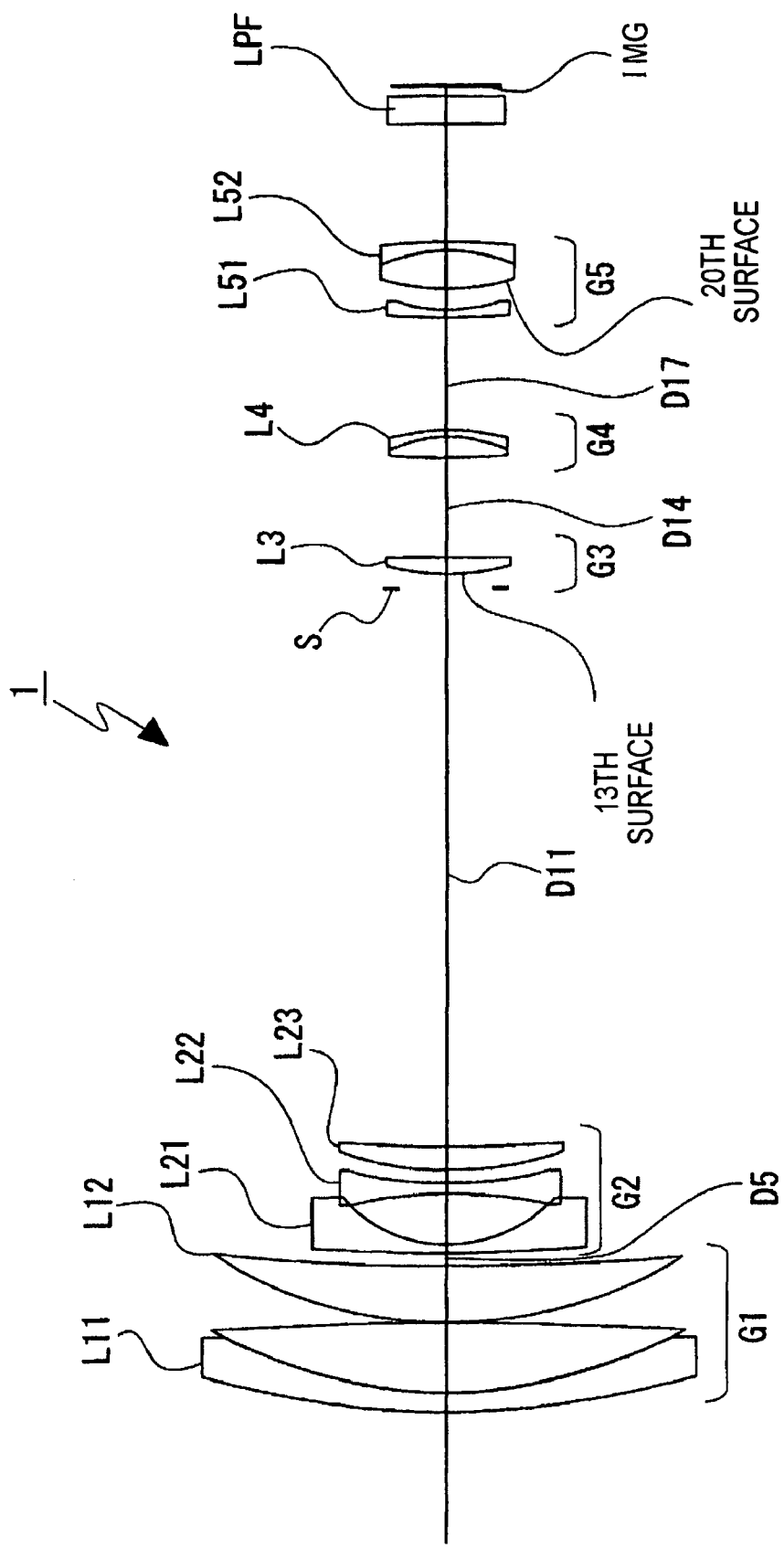
FIG. 2 illustrates the lens configuration of a zoom lens system according to a first embodiment of the present invention.

FIG. 2 illustrates the lens configuration of a zoom lens system according to a first embodiment of the present invention. A first lens unit G1 is configured of a cemented lens L11 of a negative meniscus lens having a convex surface facing the object and a positive lens having convex surface facing the object; a second lens unit G2 is configured of a negative meniscus lens L21 having a concave surface facing the image, a negative lens L22 whose surfaces are both concave, and a positive meniscus lens having a convex surface having a convex surface facing the object; a third lens unit G3 is configured of a positive meniscus lens L3 having an aspherical convex surface facing the object; a fourth lens unit G4 is configured of a cemented lens L4 of a positive lens whose surfaces are both convex and a negative meniscus lens having a concave surface facing the object; and a fifth lens unit is configured of a negative meniscus lens 51 having a concave surface facing the image and a cemented lens L52 of a positive lens having an aspherical facing the object and whose surfaces are both convex and a negative meniscus lens having a concave surface facing the object.

In the fifth lens unit G5, the negative lens L51 functions as a negative subunit and the cemented lens L52 functions as a positive lens unit, and the cemented lens L52 is shifted in a direction substantially orthogonal to the optical axis. An aperture stop S is provided close to the object side of the third lens unit G3 and moves together with the third lens unit G3 when carrying out magnification. A low-pass filter LPF is disposed between the fifth lens unit G5 and an image plane IMG.

Table 1 shows data according to a first numerical example obtained by applying specific numerical values to the first embodiment. The surface number in the data table represents the ith surface counted from the object, the radius of curvature is the axis radius of curvature of the corresponding surface, the surface distance is the axis surface distance between the ith surface and the i+1th surface, the refractive index is a value corresponding to the d-line (λ=587.6 nm) of the corresponding surface, the Abbe number is the value corresponding to the d-line of the corresponding surface, f represents the focal length, Fno represents the F-number, and 2ω represents the filed of view. A surface having a radius of curvature of zero is a flat plane.

TABLE 1 f 1.00~3.01~14.10
FNO 2.86~3.77~4.03
ω 73.37~8.89~6.22°

| Surface Number | Radius of Curvature | Surface Distance | Refractive Index | Abbe number |
|---|---|---|---|---|
| 1: | 12.3535 | 0.272 | 1.90366 | 31.1 |
| 2: | 6.6271 | 0.956 | 1.49700 | 81.6 |
| 3: | −68.6237 | 0.038 | | |
| 4: | 6.2777 | 0.798 | 1.60300 | 65.5 |
| 5: | 33.5232 | (D5) | | |
| 6: | 33.5232 | 0.113 | 1.88300 | 40.8 |
| 7: | 1.9369 | 0.744 | | |
| 8: | −5.5880 | 0.131 | 1.75500 | 52.3 |
| 9: | 5.9909 | 0.188 | | |
| 10: | 4.3925 | 0.349 | 1.94596 | 18.0 |
| 11: | 27.3383 | (D11) | | |
| 12: | 0.0000 | 0.225 | (Aperture Stop) | |
| 13: | 4.5071 | 0.197 | 1.58313 | 59.5 |
| 14: | 79.4707 | (D14) | | |
| 15: | 25.1784 | 0.280 | 1.69680 | 55.3 |
| 16: | −1.9802 | 0.075 | 1.75520 | 27.5 |
| 17: | −4.1042 | (D17) | | |
| 18: | 23.4952 | 0.094 | 1.88300 | 40.8 |
| 19: | 2.8167 | 0.282 | | |
| 20: | 3.0357 | 0.563 | 1.82080 | 42.7 |
| 21: | −2.1723 | 0.094 | 1.76182 | 26.6 |
| 22: | −16.5286 | 1.668 | | |
| 23: | 0.0000 | 0.391 | 1.51680 | 64.2 |
| 24: | 0.0000 | (Bf) | | |

According to the first embodiment, the 13th surface and the 20th surface are aspherical surfaces. Table 2 shows aspherical surface coefficients A, B, C, and D of the 4th, 6th, 8th, and 10th orders and the cone constant K of the 13th surface and the 20th surface in the first numerical example. In Table 2 and the other tables showing aspherical surface coefficients, "E-i" is an exponential notation where 10 is the base. In other words, "E-i" represents "$10^{-i}$." For example, "0.26029E-05" represents "$0.26029 \times 10^{-5}$."

TABLE 2

13th Surface  κ = 0.000000   A = −0.822452E−02   B = +0.406029E−03   C = 0.755149E−03
D = −0.170743E−02

TABLE 2-continued

| | | | |
|---|---|---|---|
| 20th Surface | κ = 0.000000 | A = −0.414312E−02 | B = −0.411830E−02 C = +0.343414E−02 |
| | | D = −0.100723E−02 | |

According to the first embodiment, when the lens position changes from the wide-angle end to the telephoto end, the surface distance D5 between the first lens unit G1 and the second lens unit G2, the surface distance D11 between the second lens unit G2 and the aperture stop S, the surface distance D14 between the third lens unit G3 and the fourth lens unit G4, and the surface distance D17 between the fourth lens unit G4 and the fifth lens unit G5 change. Table 3 shows the surface distances and the back focus Bf of the wide-angle end (f=1.000), the intermediate focal length (f=3.014), and the telephoto end (f=14.100) according to the first numerical example.

TABLE 3

| f | 1.000 | 3.014 | 14.100 |
|---|---|---|---|
| D5 | 0.169 | 3.172 | 6.610 |
| D11 | 7.929 | 3.619 | 0.488 |
| D14 | 1.440 | 0.901 | 1.789 |
| D17 | 1.635 | 2.765 | 2.051 |
| Bf | 0.150 | 0.150 | 0.150 |

Table 4 shows values of the first numerical example corresponding to Expressions 1 to 4, described above.

TABLE 4 f5n = −3.632
(1) ΔS/ft = 0.054
(2) (Ra + Rb)/(Ra − Rb) = −0.690
(3) Dsw/TLw = 0.378
(4) |f5n|/Dn = 1.154

Figure 3:
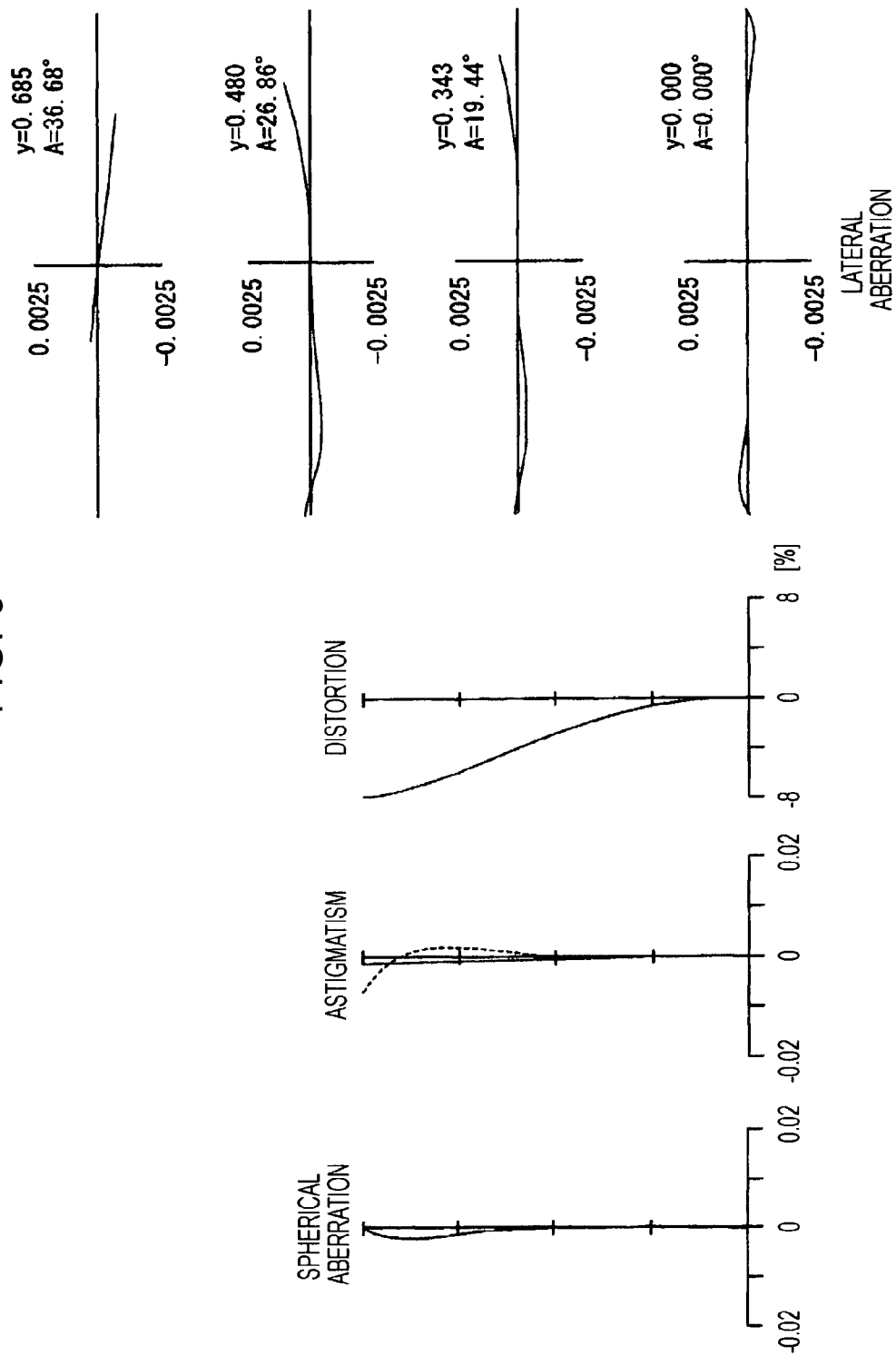
FIG. 3, together with FIGS. 4 to 8, illustrates various types of aberration according to a first numerical example obtained by applying specific numerical values to the zoom lens system according to the first embodiment of the present invention.
Figure 4:
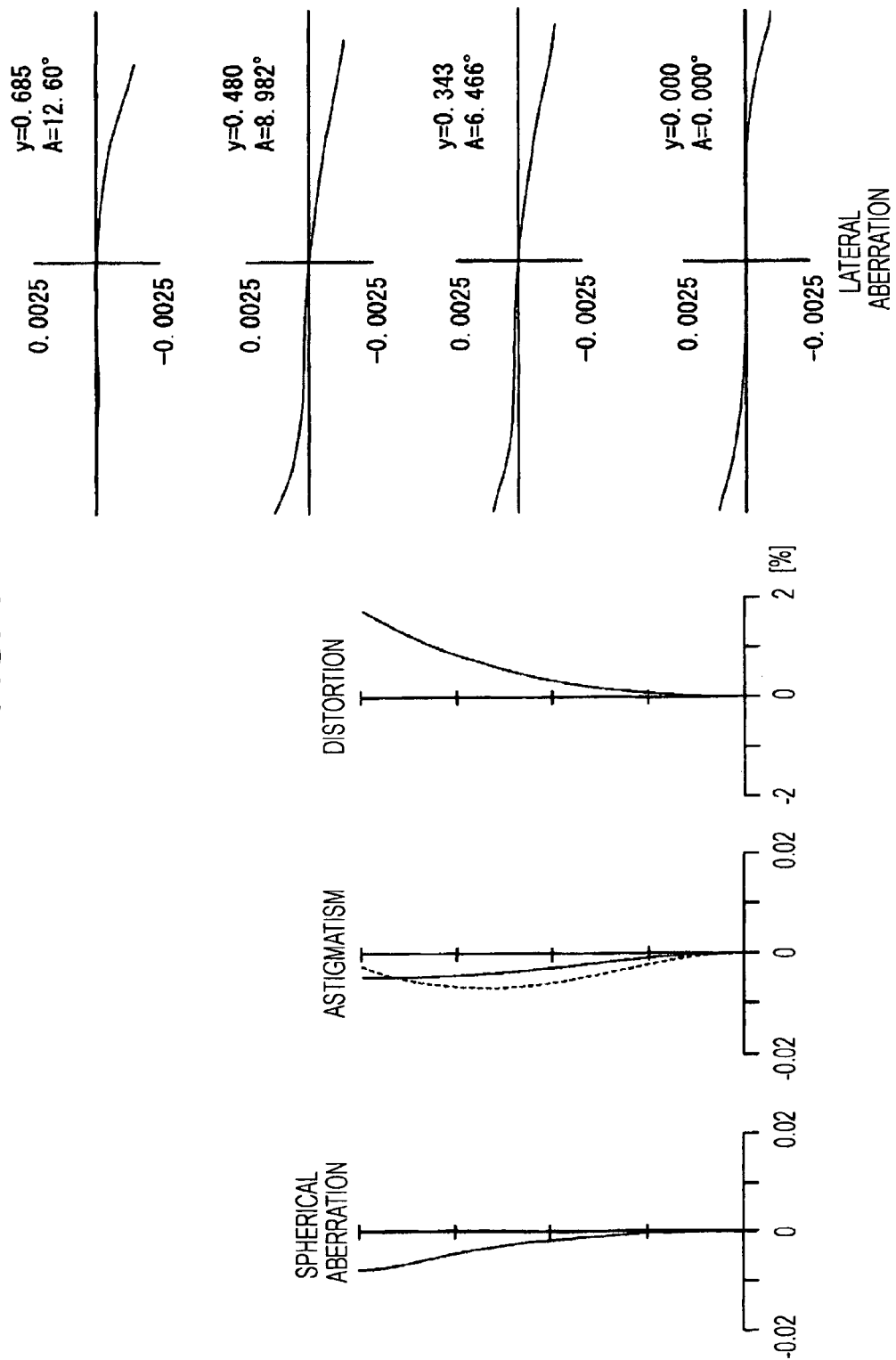
FIG. 4 illustrates spherical aberration, astigmatism, distortion, and lateral aberration at an intermediate focus length.
Figure 5:
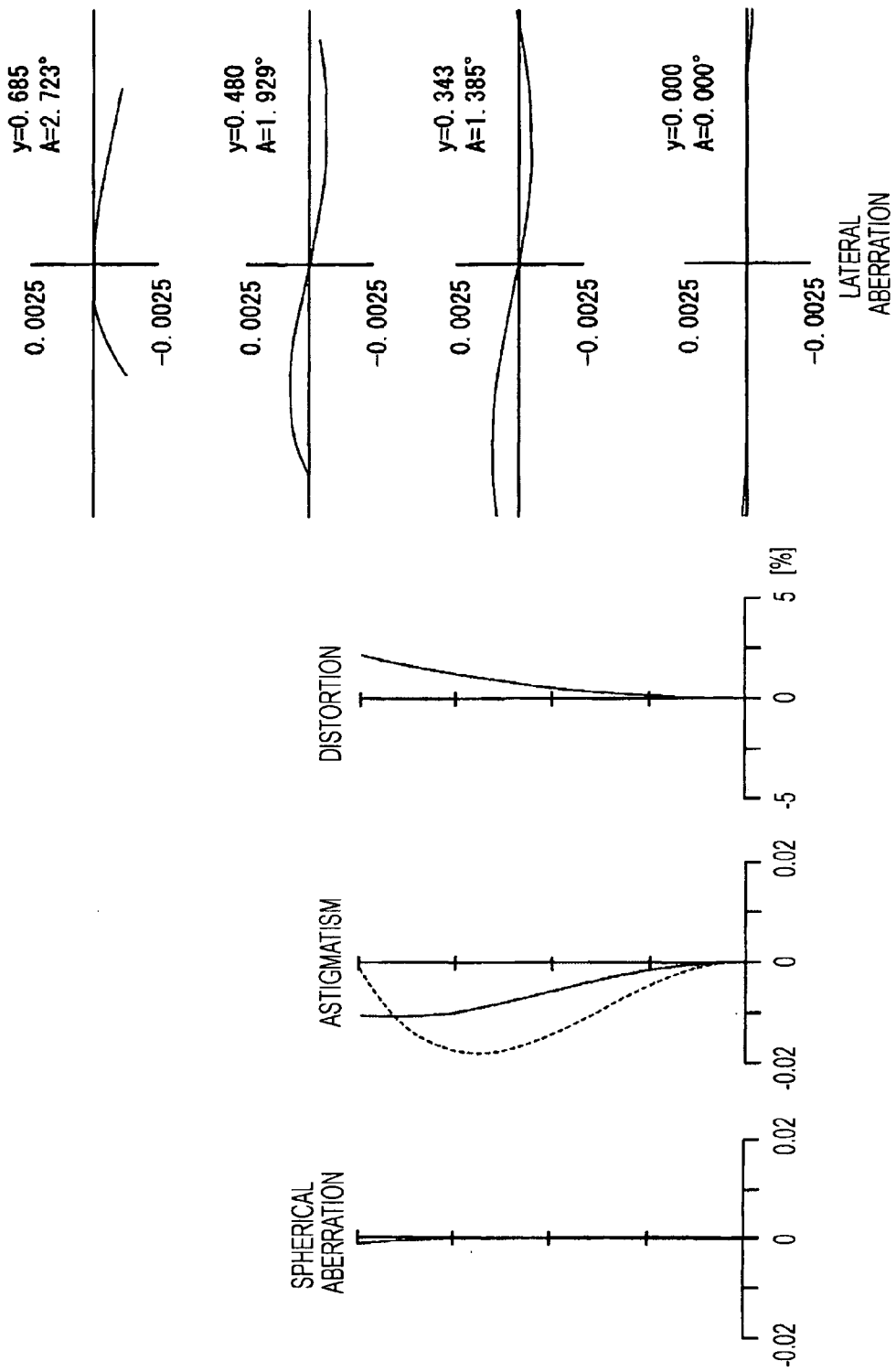
FIG. 5 illustrates spherical aberration, astigmatism, distortion, and lateral aberration at the telephoto end.

FIGS. 3 to 5 illustrate various aberrations generated according to the first numerical example, when focus is at infinity, wherein FIG. 3 illustrates various aberrations at the wide-angle end (f=1.000), FIG. 4 illustrates the intermediate focal length (f=3.014), and FIG. 5 illustrates the telephoto end (f=14.100).

In FIGS. 3 to 5, the solid line in the spherical aberration diagram represents spherical aberration, the solid line in the astigmatism diagram represents the sagittal image plane, and the dotted line in the astigmatism diagram represents the meridional image plane. In the lateral aberration diagram, A represents the angle of view and y represents the image height.

Figure 6:
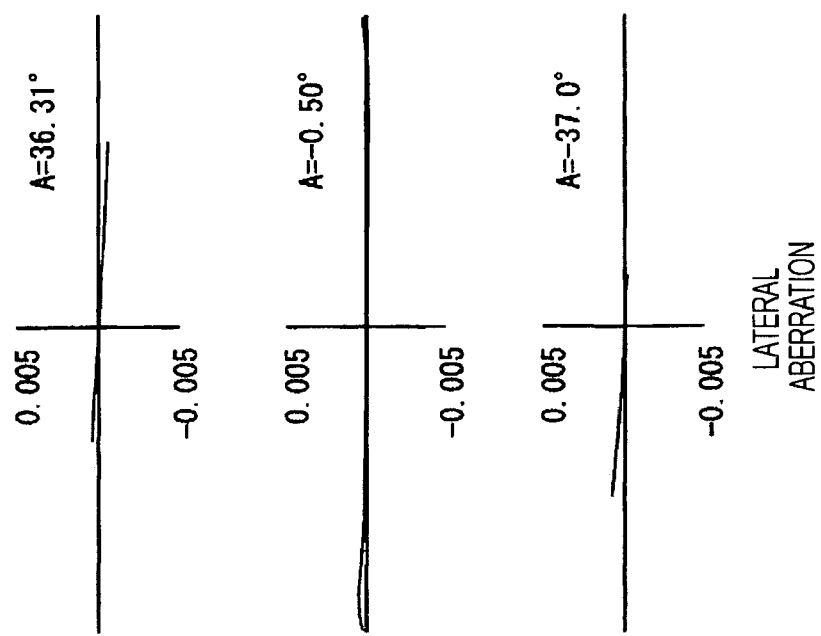
FIG. 6 illustrates lateral aberration when a lens is shifted by about 0.5 degrees at the wide-angle end.
Figure 7:
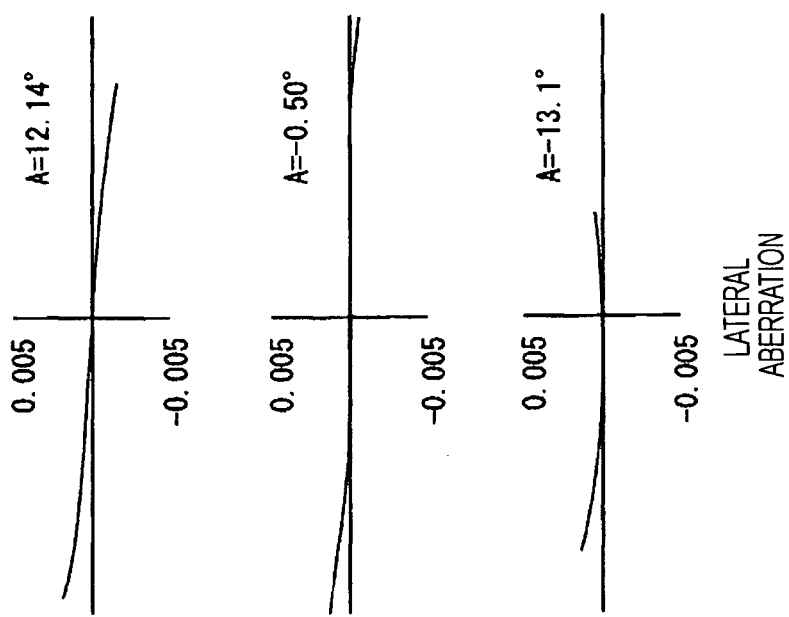
FIG. 7 illustrates lateral aberration when a lens is shifted by about 0.5 degrees at intermediate focus length.
Figure 8:
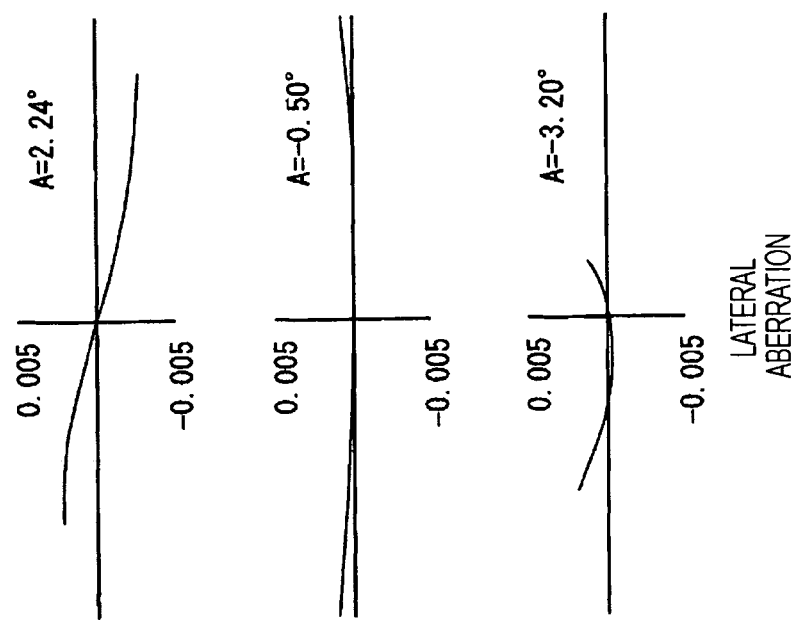
FIG. 8 illustrates lateral aberration when a lens is shifted by about 0.5 degrees at the telephoto end.

FIGS. 6 to 8 illustrate lateral aberration generated according to the first numerical example, when focus is at infinity and when the lens is shifted by about 0.5 degrees, wherein FIG. 6 illustrates the lateral aberration at the wide-angle end (f=1.000), FIG. 7 illustrates the intermediate focal length (f=3.014), and FIG. 7 illustrates the telephoto end (f=14.100).

From these aberration diagrams, it is apparent that the zoom lens system according to the first numerical example satisfactorily corrects the various aberrations and has excellent image-forming performance.

Figure 9:
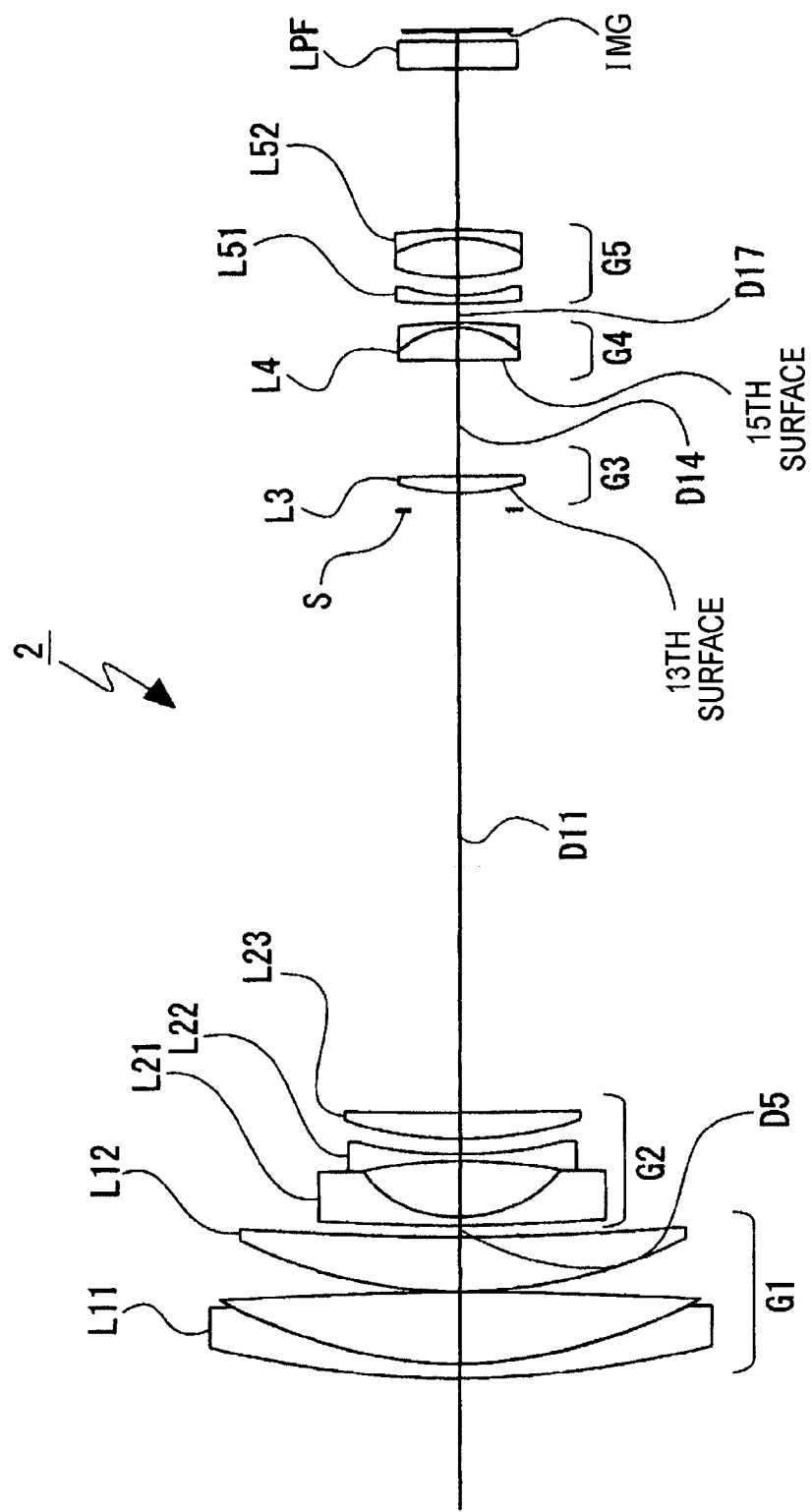
FIG. 9 illustrates the lens configuration of a zoom lens system according to a second embodiment of the present invention.

FIG. 9 illustrates the lens configuration of a zoom lens system according to a second embodiment of the present invention. A first lens unit G1 is configured of a cemented lens L11 of a negative meniscus lens having a convex surface facing the object and a positive lens having convex surface facing the object, and a positive lens L12 having a convex lens facing the object; a second lens unit G2 is configured of a negative meniscus lens L21 having a concave surface facing the image, a negative lens L22 whose surfaces are both concave, and a positive meniscus lens L23 having a convex surface facing the object; a third lens unit G3 is configured of a positive meniscus lens having an aspherical convex surface facing the object; a fourth lens unit G4 configured of a cemented lens L4 of a positive lens having an aspherical surface facing the object and whose surfaces are both convex and a negative meniscus lens having a concave surface facing the object; and a fifth lens unit G5 is configured of a negative meniscus lens L51 having a concave surface facing the image and a cemented lens L52 of a positive lens whose surfaces are both convex and a negative meniscus lens having a concave surface facing the object.

The negative lens L51 in the fifth lens unit G5 functions as a negative subunit and the cemented lens L52 functions as a positive subunit. The cemented lens L52 is shifted in a direction substantially orthogonal to the optical axis. An aperture stop S is provided close to the object side of the third lens unit G3 and moves together with the third lens unit G3 when carrying out magnification. A low-pass filter LPF is disposed between the fifth lens unit G5 and an image plane IMG.

Table 5 shows data according to a second numerical example obtained by applying specific numerical values to the second embodiment.

TABLE 5 f 1.00~3.20~14.10
FNO 2.87~3.61~4.03
2ω 42.89~23.52~5.39°

| Surface Number | Radius of Curvature | Surface Distance | Refractive Index | Abbe number |
|---|---|---|---|---|
| 1: | 14.0861 | 0.270 | 1.90366 | 31.1 |
| 2: | 7.0926 | 0.923 | 1.49700 | 81.6 |
| 3: | −43.0379 | 0.037 | | |
| 4: | 6.6344 | 0.724 | 1.60300 | 65.5 |
| 5: | 40.4514 | (D5) | | |
| 6: | 33.3053 | 0.112 | 1.88300 | 40.8 |
| 7: | 1.8894 | 0.762 | | |
| 8: | −7.1286 | 0.130 | 1.88300 | 40.8 |
| 9: | 7.6737 | 0.186 | | |
| 10: | 4.3547 | 0.373 | 1.94596 | 18.0 |
| 11: | 33.4058 | (D11) | | |
| 12: | 0.0000 | 0.223 | (Aperture Stop) | |
| 13: | 2.7649 | 0.233 | 1.58313 | 59.5 |
| 14: | 27.5363 | (D14) | | |
| 15: | −35.1305 | 0.385 | 1.74330 | 49.2 |
| 16: | −1.2655 | 0.074 | 1.64769 | 33.8 |
| 17: | −7.4522 | (D17) | | |
| 18: | 13.1023 | 0.093 | 1.88300 | 40.8 |
| 19: | 2.7925 | 0.279 | | |
| 20: | 2.8183 | 0.506 | 1.80420 | 46.5 |
| 21: | −2.7342 | 0.093 | 1.90366 | 31.1 |
| 22: | −41.2661 | 2.196 | | |
| 23: | 0.0000 | 0.388 | 1.51680 | 64.2 |
| 24: | 0.0000 | (Bf) | | |

According to the second embodiment, the 13th surface and the 20th surface are aspherical surfaces. Table 6 shows aspherical surface coefficients A, B, C, and D of the 4th, 6th, 8th, and 10th orders and the cone constant κ of the 13th surface and the 20th surface in the second numerical example.

TABLE 6

| | | | | |
|---|---|---|---|---|
| 13th Surface | κ = 0.000000 | A = −0.663762E−02 | B = +0.309178E−02 | C = −0.800163E−02 |
| | | D = +0.553125E−02 | | |
| 20th Surface | κ = 0.000000 | A = −0.142867E−01 | B = −0.522241E−02 | C = +0.511481E−02 |
| | | D = −0.423492E−02 | | |

According to the second embodiment, when the lens position changes from the wide-angle end to the telephoto end, the surface distance D5 between the first lens unit G1 and the second lens unit G2, the surface distance D11 between the second lens unit G2 and the aperture stop S, the surface distance D14 between the third lens unit G3 and the fourth lens unit G4, and the surface distance D17 between the fourth lens unit G4 and the fifth lens unit G5 change. Table 7 shows the surface distances and the back focus Bf of the wide-angle end (f=1.000), the intermediate focal length (f=3.197), and the telephoto end (f=14.097) according to the second numerical example.

TABLE 7

| f | 1.000 | 3.197 | 14.097 |
|---|---|---|---|
| D5 | 0.168 | 3.455 | 6.786 |
| D11 | 8.395 | 3.490 | 0.484 |
| D14 | 1.641 | 1.407 | 2.514 |
| D17 | 0.279 | 1.360 | 0.699 |
| Bf | 0.149 | 0.149 | 0.149 |

Table 8 shows values of the second numerical example corresponding to Expressions 1 to 4, described above.

TABLE 8 f5n = −4.036
(1) ΔS/ft = 0.092
(2) (Ra + Rb)/(Ra − Rb) = −0.872
(3) Dsw/TLw = 0.351
(4) |f5n|/Dn = 1.118

Figure 10:
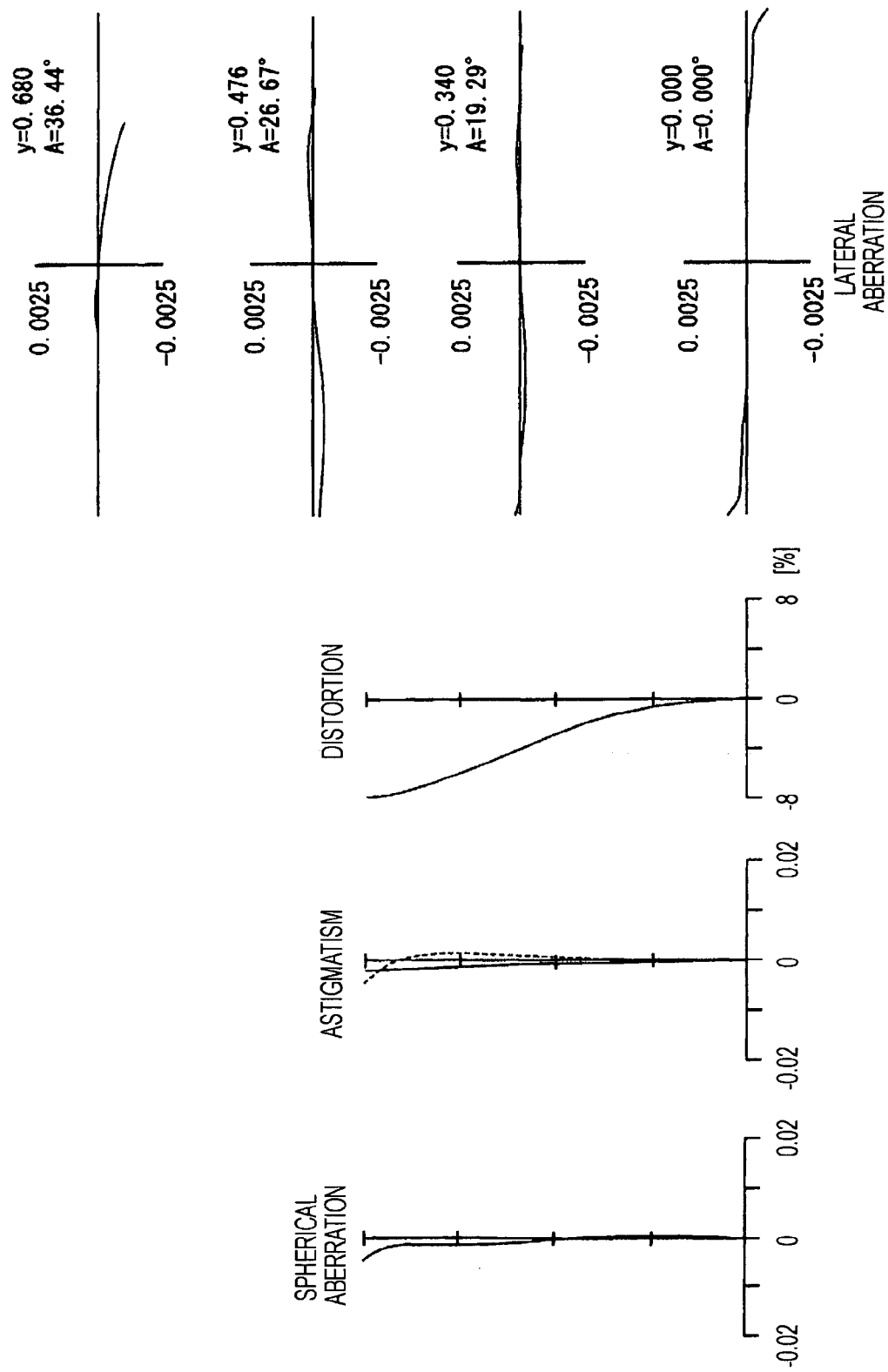
FIG. 10, together with FIGS. 11 to 15, illustrates various types of aberration according to a first numerical example obtained by applying specific numerical values to the zoom lens system according to the second embodiment of the present invention.
Figure 11:
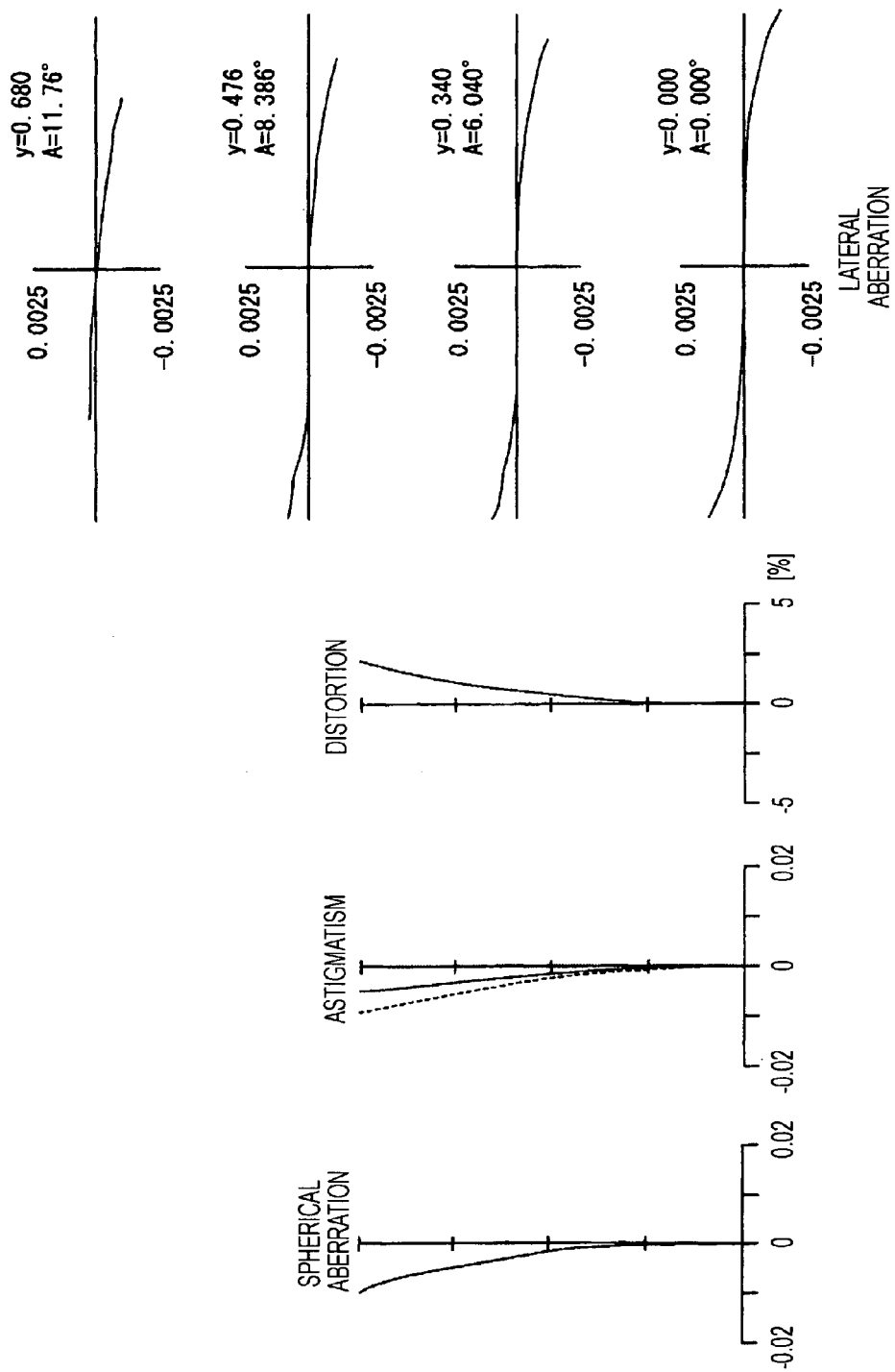
FIG. 11 illustrates spherical aberration, astigmatism, distortion, and lateral aberration at an intermediate focus length.
Figure 12:
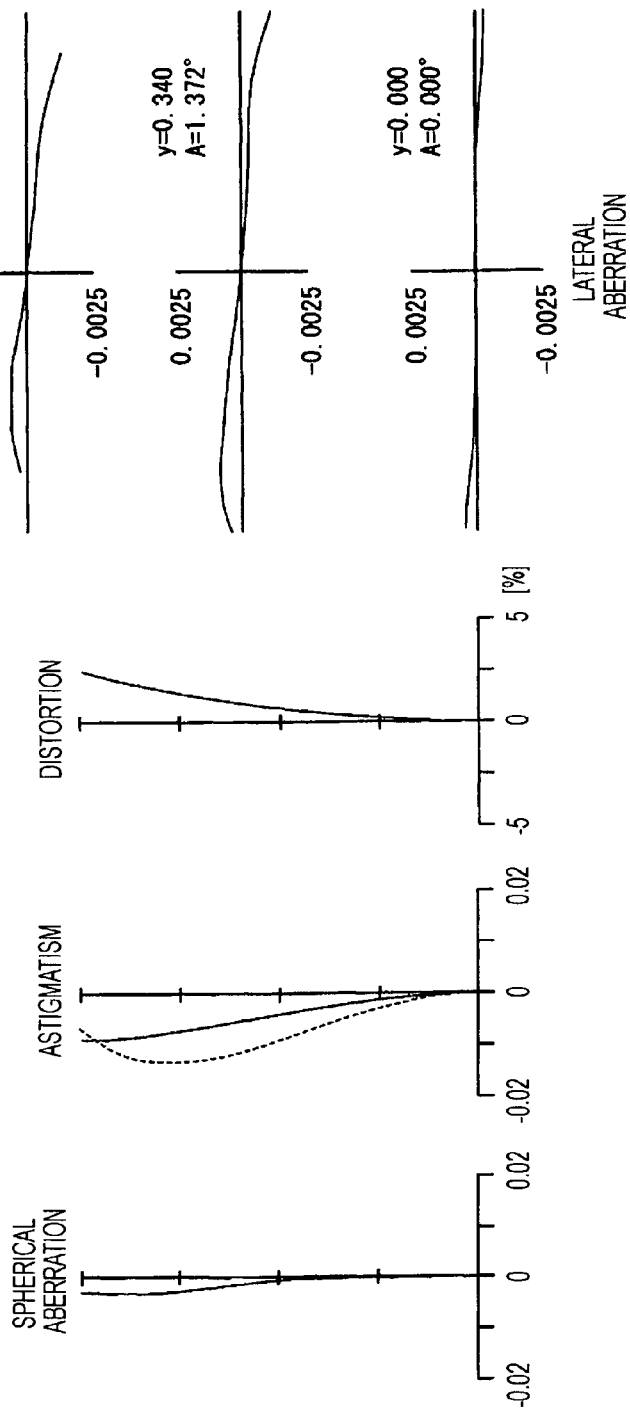
FIG. 12 illustrates spherical aberration, astigmatism, distortion, and lateral aberration at the telephoto end.

FIGS. 10 to 12 illustrate various aberrations generated according to the second numerical example, when focus is at infinity, wherein FIG. 10 illustrates various aberrations at the wide-angle end (f=1.000), FIG. 11 illustrates the intermediate focal length (f=3.197), and FIG. 12 illustrates the telephoto end (f=14.097).

In FIGS. 10 to 12, the solid line in the spherical aberration diagram represents spherical aberration, the solid line in the astigmatism diagram represents the sagittal image plane, and the dotted line in the astigmatism diagram represents the meridional image plane. In the lateral aberration diagram, A represents the angle of view and y represents the image height.

Figure 13:
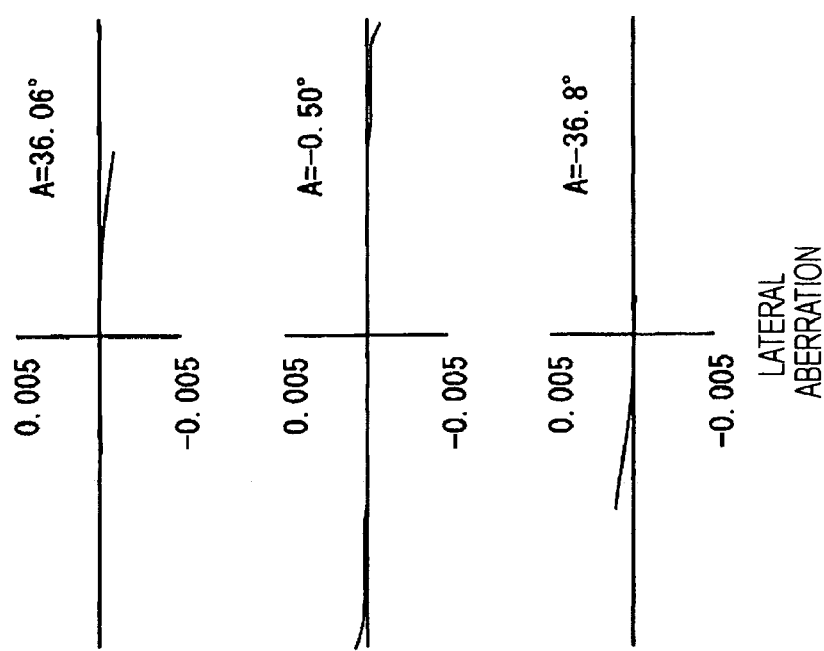
FIG. 13 illustrates lateral aberration when a lens is shifted by about 0.5 degrees at the wide-angle end.
Figure 14:
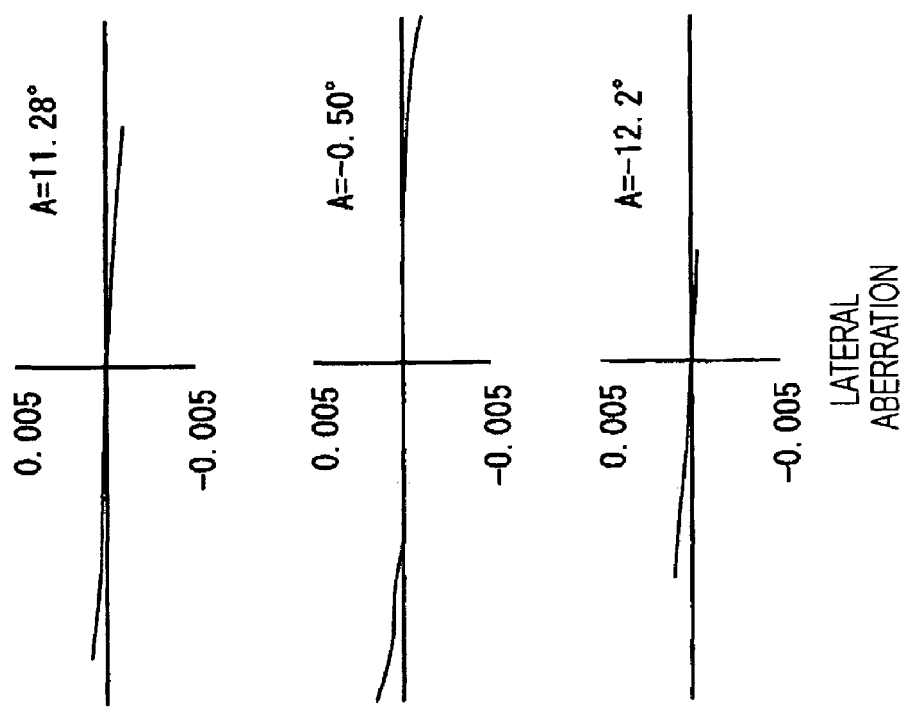
FIG. 14 illustrates lateral aberration when a lens is shifted by about 0.5 degrees at intermediate focus length.
Figure 15:
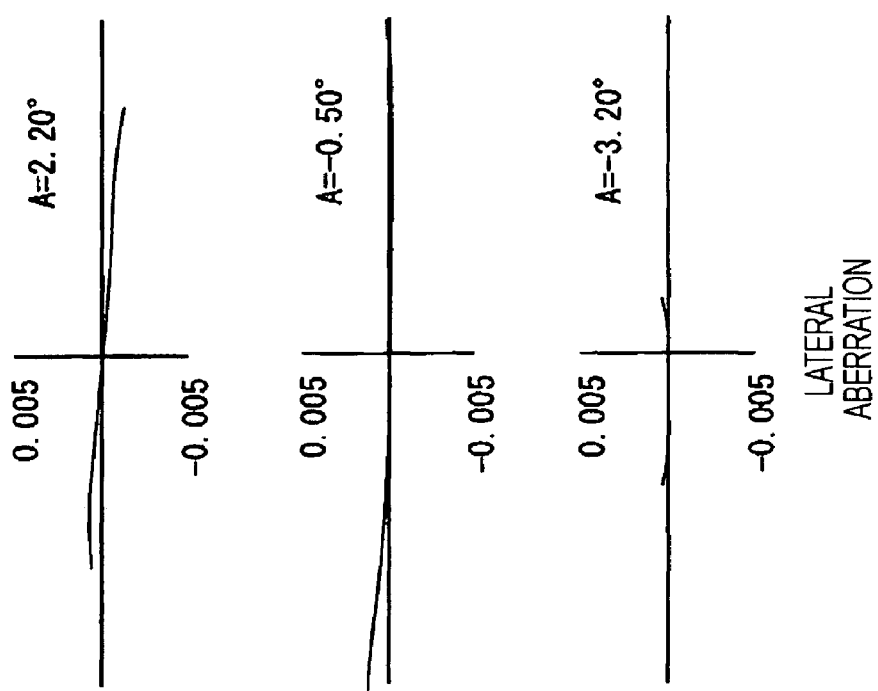
FIG. 15 illustrates lateral aberration when a lens is shifted by about 0.5 degrees at the telephoto end.

FIGS. 13 to 15 illustrate lateral aberration generated according to the second numerical example, when focus is at infinity and when the lens is shifted by about 0.5 degrees, wherein FIG. 13 illustrates the lateral aberration at the wide-angle end (f=1.000), FIG. 14 illustrates the intermediate focal length (f=3.197), and FIG. 15 illustrates the telephoto end (f=14.097).

From these aberration diagrams, it is apparent that the zoom lens system according to the second numerical example satisfactorily corrects the various aberrations and has excellent image-forming performance.

Figure 16:
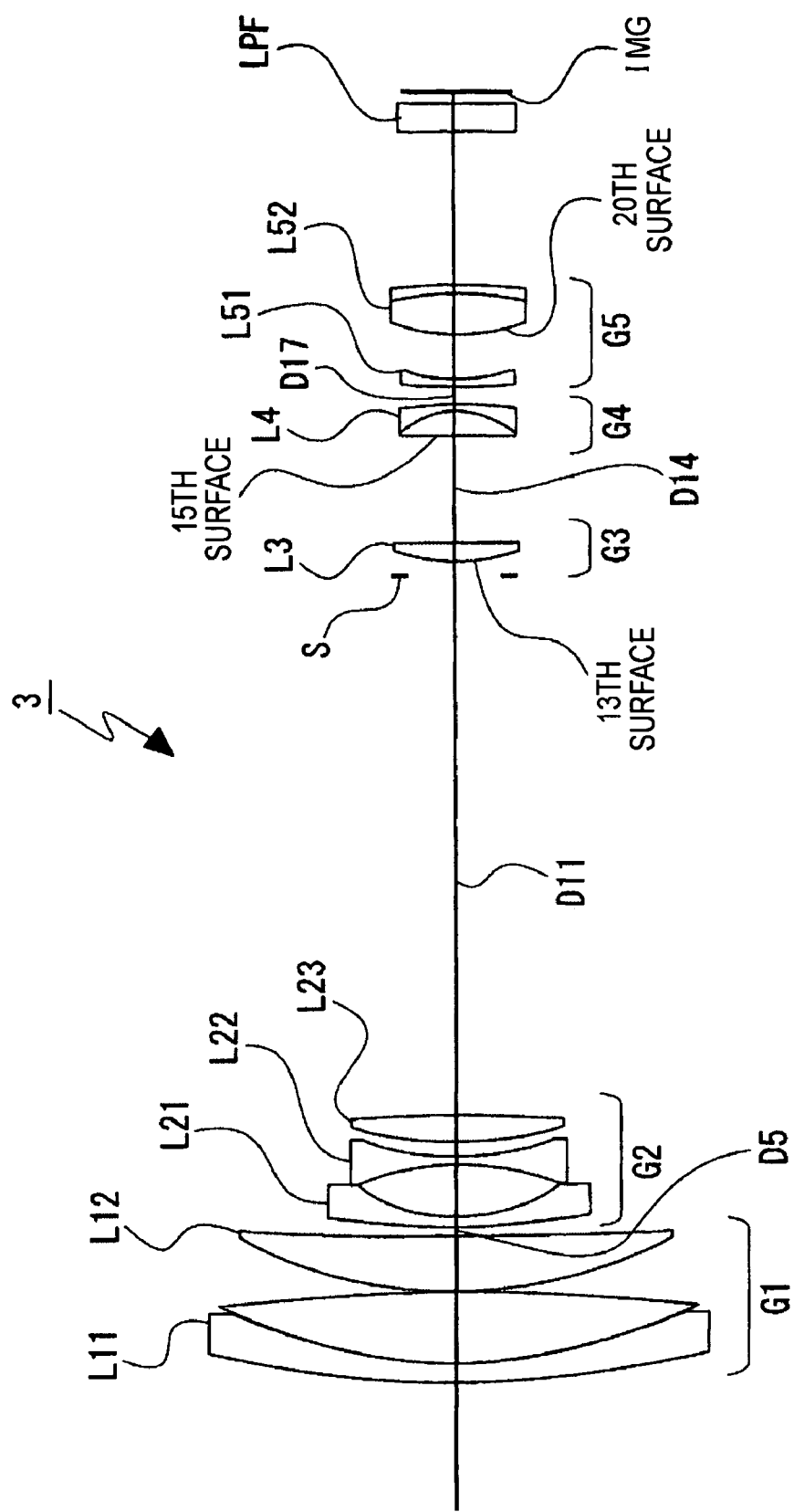
FIG. 16 illustrates the lens configuration of a zoom lens system according to a third embodiment of the present invention.

FIG. 16 illustrates the lens configuration of a zoom lens system according to a third embodiment of the present invention. A first lens unit G1 is configured of a cemented lens L11 of a negative meniscus lens having a convex surface facing the object and a positive lens having convex surface facing the object, and a positive lens L12 having a convex lens facing the object; a second lens unit G2 is configured of a negative meniscus lens L21 having a concave surface facing the image, a negative lens L22 whose surfaces are both concave, and a lens L23 whose surfaces are both convex; a third lens unit G3 is configured of a positive lens having an aspherical surface facing the object and shoes surfaces are both convex; a fourth lens unit G4 configured of a cemented lens L4 of a positive meniscus lens having an aspherical surface facing the object and a convex surface having the image and a negative meniscus lens having a concave surface facing the object; and a fifth lens unit G5 is configured of a negative meniscus lens L51 having a convex surface facing the object and a cemented lens L52 of a positive lens having an aspherical surface facing the object and whose surfaces are both convex and a negative meniscus lens having a concave surface facing the object.

The negative lens L51 in the fifth lens unit G5 functions as a negative subunit and the cemented lens L52 functions as a positive subunit. The cemented lens L52 is shifted in a direction substantially orthogonal to the optical axis. An aperture stop S is provided close to the object side of the third lens unit G3 and moves together with the third lens unit G3 when carrying out magnification. A low-pass filter LPF is disposed between the fifth lens unit G5 and an image plane IMG.

Table 9 shows data according to a third numerical example obtained by applying specific numerical values to the third embodiment.

TABLE 9 f 1.00~2.83~14.09
FNO 2.86~3.61~4.03
2ω 70.74~25.34~5.14°

| Surface Number | Radius of Curvature | Surface Distance | Refractive Index | Abbe number |
|---|---|---|---|---|
| 1: | 14.4208 | 0.259 | 1.90366 | 31.1 |
| 2: | 6.9464 | 0.920 | 1.49700 | 81.6 |
| 3: | −24.6900 | 0.036 | | |
| 4: | 6.1830 | 0.682 | 1.60300 | 65.5 |
| 5: | 33.9441 | (D5) | | |
| 6: | 10.8678 | 0.107 | 1.88300 | 40.8 |
| 7: | 2.2431 | 0.713 | | |
| 8: | −3.4366 | 0.125 | 1.88300 | 40.8 |
| 9: | 4.1829 | 0.179 | | |
| 10: | 4.9742 | 0.357 | 1.94596 | 18.0 |
| 11: | −20.1751 | (D11) | | |
| 12: | 0.0000 | 0.215 | (Aperture Stop) | |
| 13: | 2.5469 | 0.234 | 1.58313 | 59.5 |
| 14: | 91.0282 | (D14) | | |
| 15: | −17.1141 | 0.339 | 1.74330 | 49.2 |
| 16: | −1.1790 | 0.072 | 1.64769 | 33.8 |
| 17: | −6.1596 | (D17) | | |
| 18: | 16.2323 | 0.089 | 1.88300 | 40.8 |
| 19: | 2.6823 | 0.617 | | |
| 20: | 2.8870 | 0.536 | 1.69350 | 53.3 |
| 21: | −4.9000 | 0.089 | 1.92286 | 20.9 |
| 22: | −8.7104 | 2.040 | | |
| 23: | 0.0000 | 0.373 | 1.51680 | 64.2 |
| 24: | 0.0000 | (Bf) | | |

According to the third embodiment, the 13th surface, the 15th surface, and the 20th surface are aspherical surfaces. Table 10 shows aspherical surface coefficients A, B, C, and D of the 4th, 6th, 8th, and 10th orders and the cone constant κ of the 13th surface, the 15th surface, and the 20th surface in the third numerical example.

TABLE 10

| | | | | |
|---|---|---|---|---|
| 13th Surface | κ = +0.000000 | A = −0.865064E−02 | B = +0.947240E−03 | C = −0.719388E−02 |
| | | D = +0.650244E−02 | | |
| 15th Surface | κ = +0.000000 | A = −0.185485E−01 | B = −0.925019E−03 | C = −0.471264E−02 |
| | | D = +0.233050E−02 | | |
| 20th Surface | κ = +0.000000 | A = −0.386382E−02 | B = +0.360042E−04 | C = −0.841154E−03 |
| | | D = +0.475501E−03 | | |

According to the third embodiment, when the lens position changes from the wide-angle end to the telephoto end, the surface distance D5 between the first lens unit G1 and the second lens unit G2, the surface distance D11 between the second lens unit G2 and the aperture stop S, the surface distance D14 between the third lens unit G3 and the fourth lens unit G4, and the surface distance D17 between the fourth lens unit G4 and the fifth lens unit G5 change. Table 11 shows the surface distances and the back focus Bf of the wide-angle end (f=1.000), the intermediate focal length (f=2.825), and the telephoto end (f=14.093) according to the third numerical example.

TABLE 11

| f | 1.000 | 2.825 | 14.093 |
|---|---|---|---|
| D5 | 0.161 | 2.834 | 6.095 |
| D11 | 7.215 | 3.402 | 0.465 |
| D14 | 1.399 | 1.064 | 1.909 |
| D17 | 0.268 | 1.221 | 0.575 |
| Bf | 0.143 | 0.143 | 0.143 |

Table 12 shows values of the third numerical example corresponding to Expressions 1 to 4, described above.

TABLE 12

| | f5n = −3.650 |
|---|---|
| (1) | ΔS/ft = 0.058 |
| (2) | (Ra + Rb)/(Ra − Rb) = −0.502 |
| (3) | Dsw/TLw = 0.374 |
| (4) | |f5n|/Dn = 0.961 |

Figure 17:
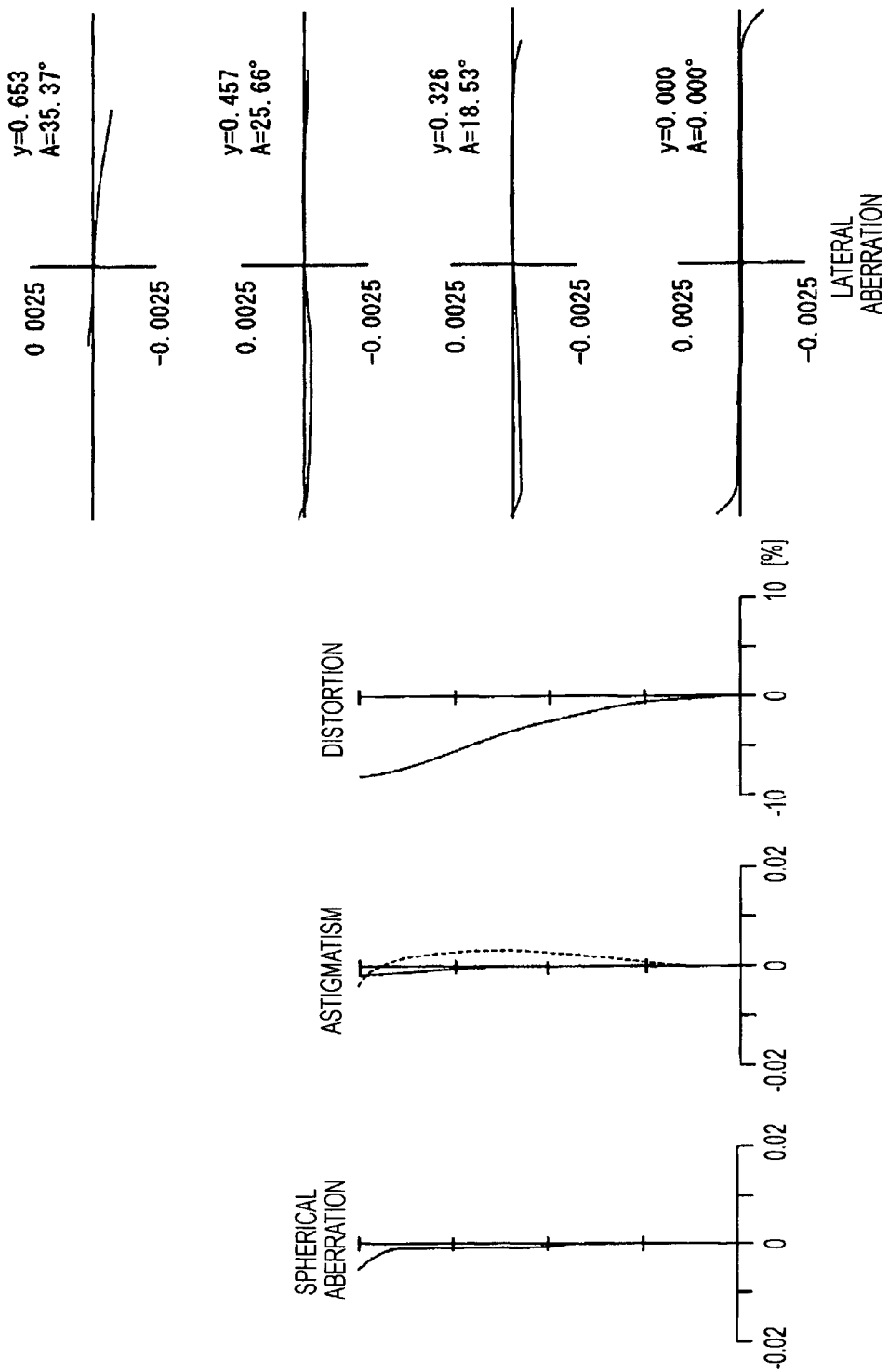
FIG. 17, together with FIGS. 18 to 22, illustrates various types of aberration according to a first numerical example obtained by applying specific numerical values to the zoom lens system according to the third embodiment of the present invention.
Figure 18:
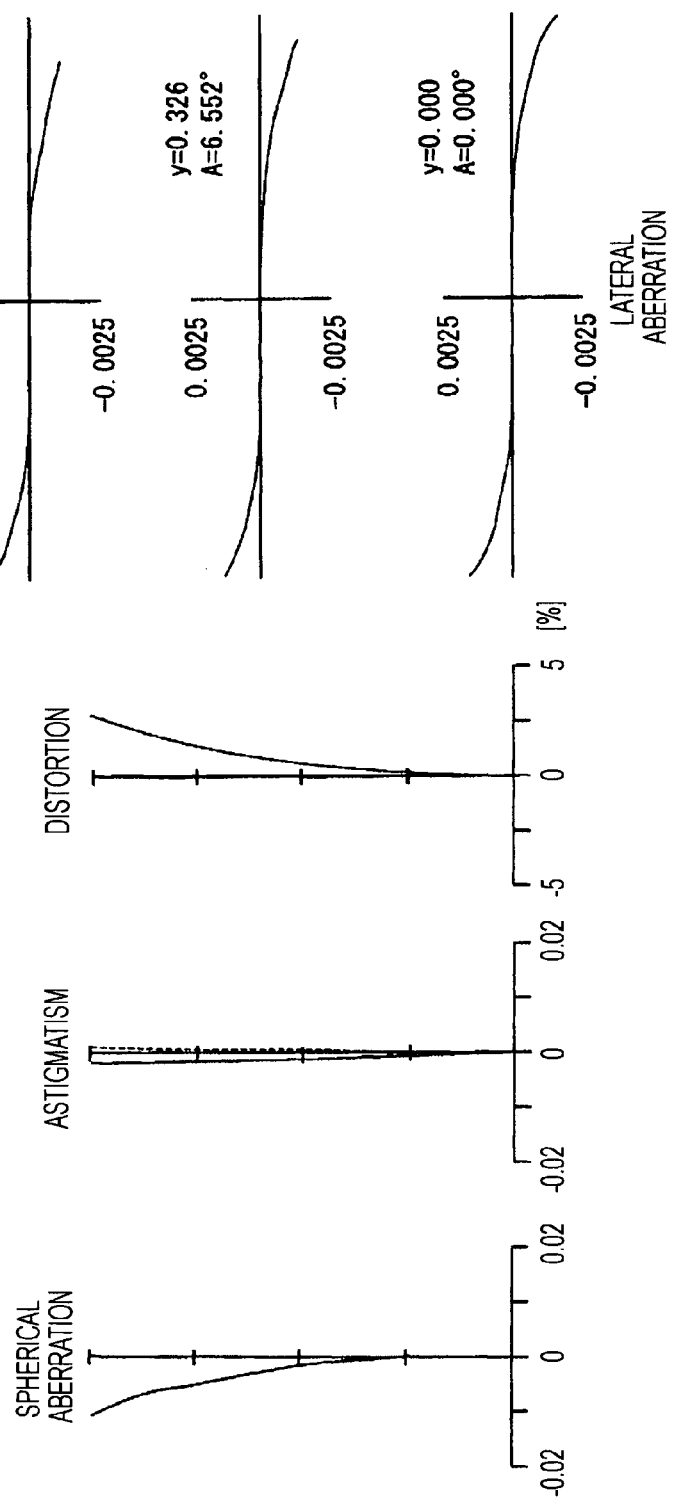
FIG. 18 illustrates spherical aberration, astigmatism, distortion, and lateral aberration at an intermediate focus length.
Figure 19:
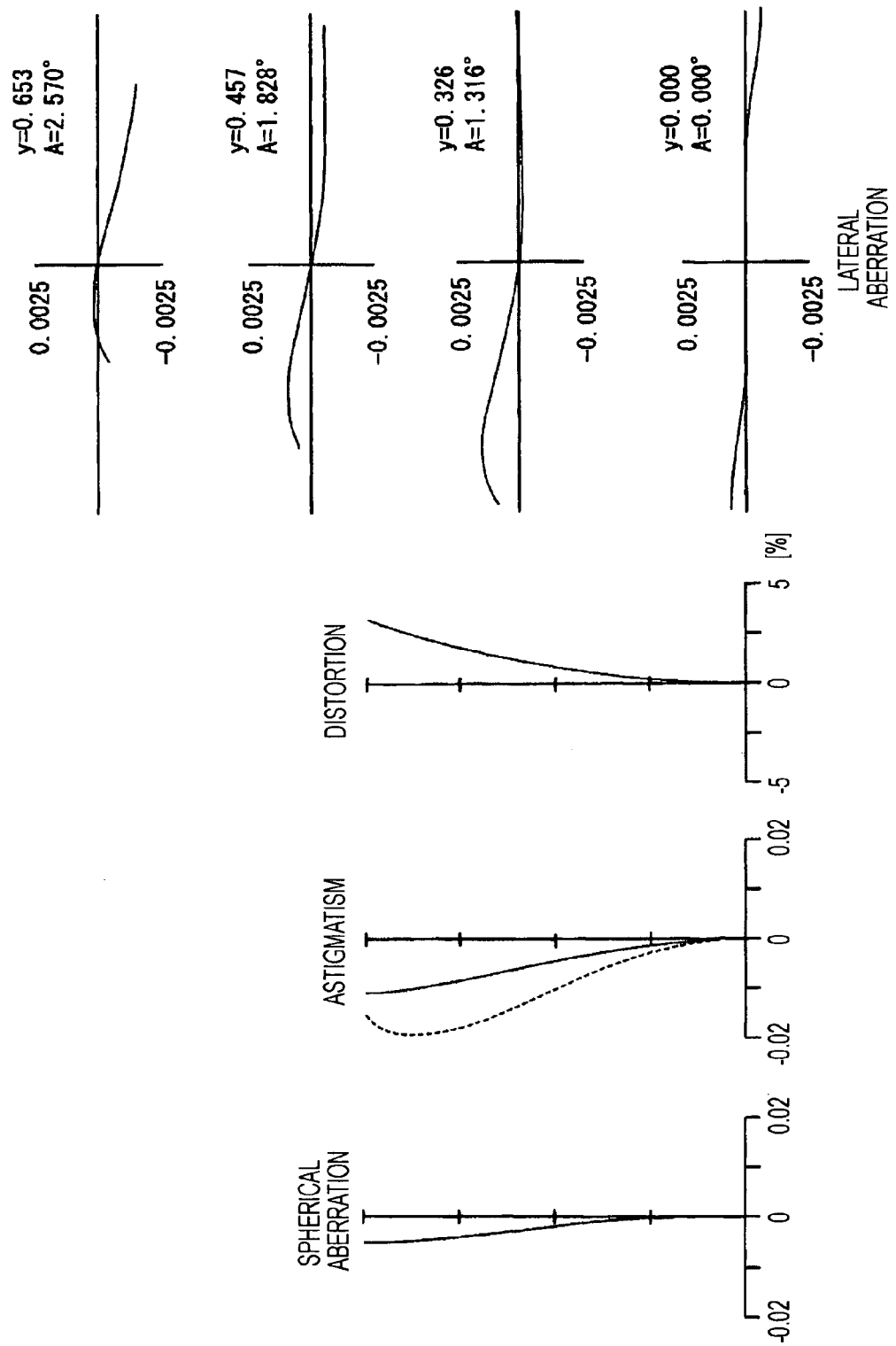
FIG. 19 illustrates spherical aberration, astigmatism, distortion, and lateral aberration at the telephoto end.

FIGS. 17 to 19 illustrate various aberrations generated according to the third numerical example, when focus is at infinity, wherein FIG. 17 illustrates various aberrations at the wide-angle end (f=1.000), FIG. 18 illustrates the intermediate focal length (f=2.825), and FIG. 19 illustrates the telephoto end (f=14.093).

In FIGS. 17 to 19, the solid line in the spherical aberration diagram represents spherical aberration, the solid line in the astigmatism diagram represents the sagittal image plane, and the dotted line in the astigmatism diagram represents the meridional image plane. In the lateral aberration diagram, A represents the angle of view and y represents the image height.

Figure 20:
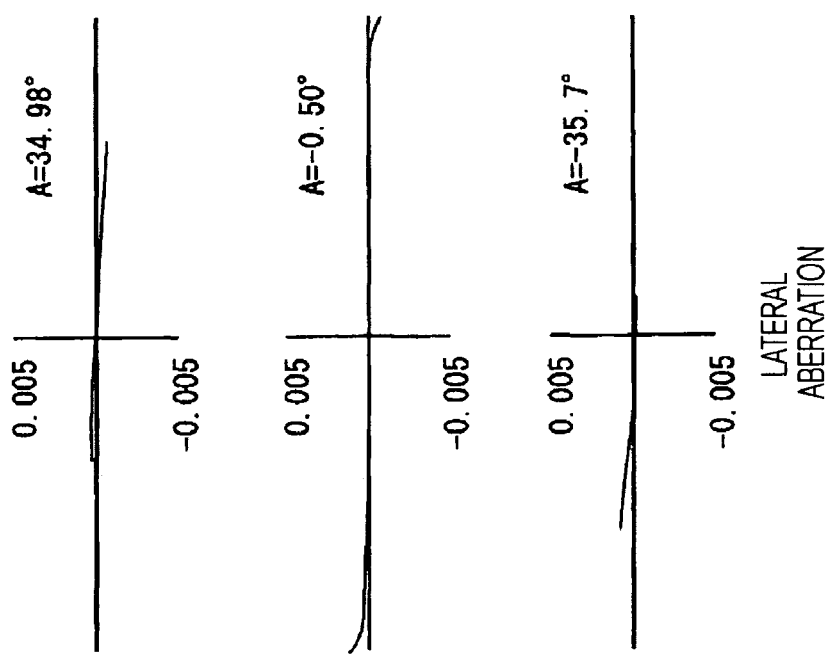
FIG. 20 illustrates lateral aberration when a lens is shifted by about 0.5 degrees at the wide-angle end.
Figure 21:
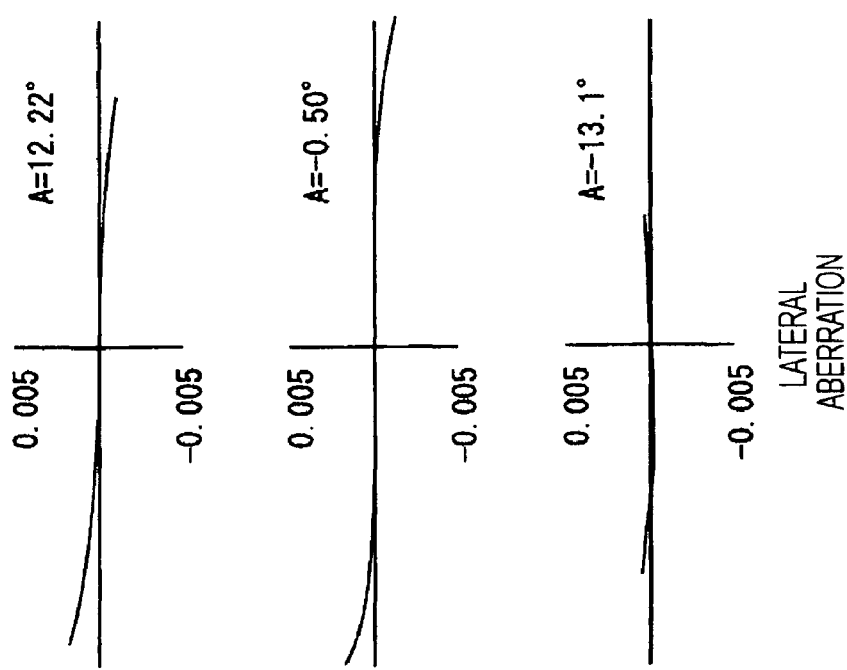
FIG. 21 illustrates lateral aberration when a lens is shifted by about 0.5 degrees at intermediate focus length.
Figure 22:
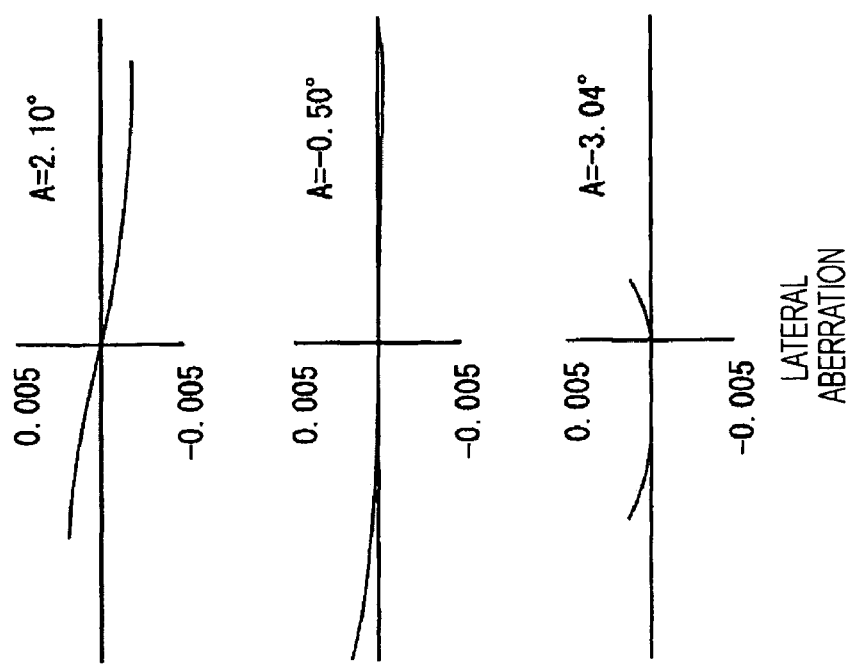
FIG. 22 illustrates lateral aberration when a lens is shifted by about 0.5 degrees at the telephoto end.

FIGS. 20 to 22 illustrate lateral aberration generated according to the third numerical example, when focus is at infinity and when the lens is shifted by about 0.5 degrees, wherein FIG. 20 illustrates the lateral aberration at the wide-angle end (f=1.000), FIG. 21 illustrates the intermediate focal length (f=2.825), and FIG. 22 illustrates the telephoto end (f=14.093).

From these aberration diagrams, it is apparent that the zoom lens system according to the third numerical example satisfactorily corrects the various aberrations and has excellent image-forming performance.

Figure 28:
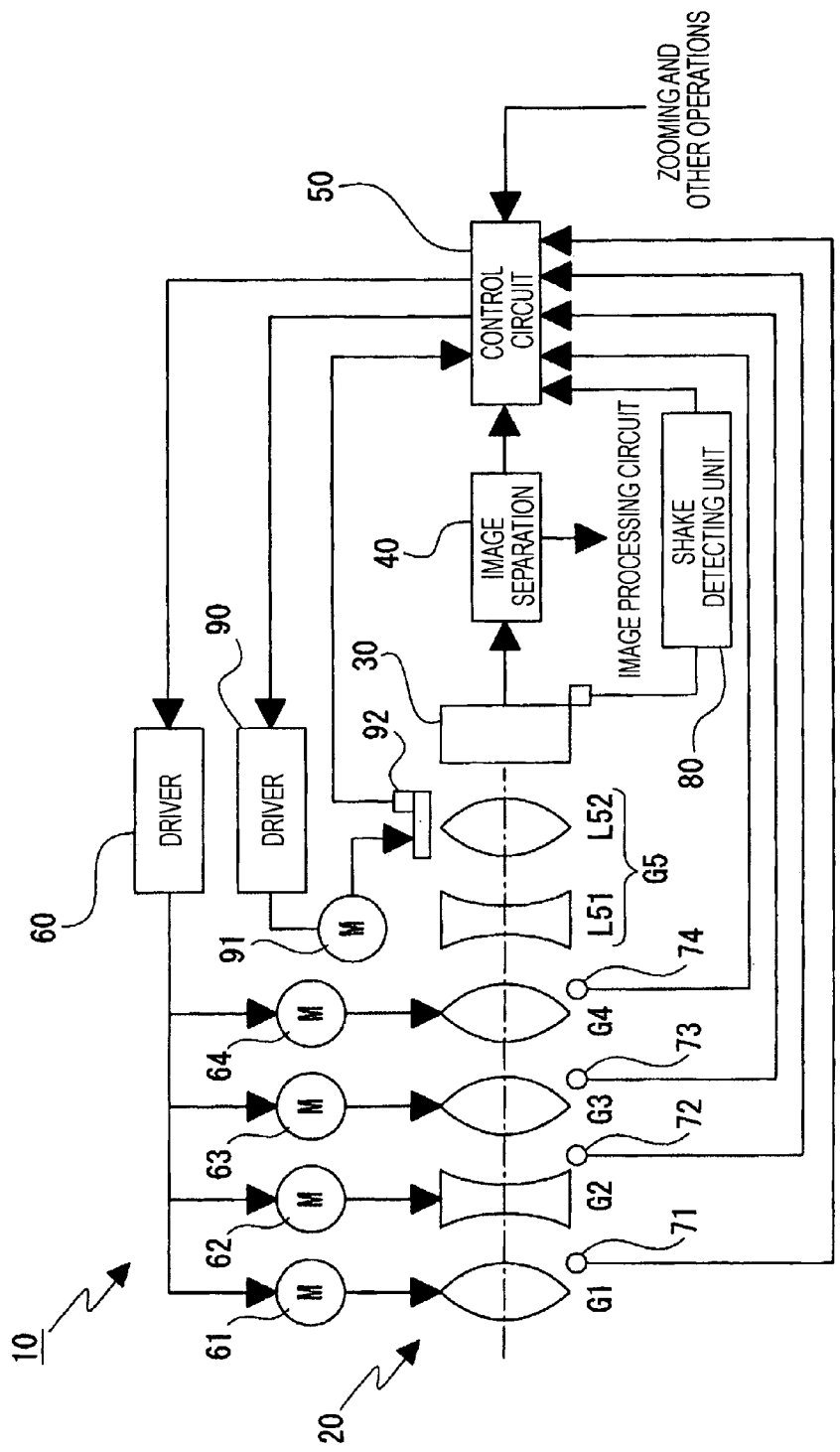
FIG. 28 is a block diagram illustrating an image-pickup apparatus according to an embodiment of the present invention.

FIG. 28 illustrates an image-pickup apparatus according to an embodiment of the present invention.

An image-pickup apparatus 10 includes a zoom lens system 20 and an image-pickup element 30 configured to convert an optical image formed by the zoom lens system 20 into an electric signal. As the image-pickup element 30, a photoelectric conversion element, such as a charge coupled device (CCD) or a complementary metal-oxide semiconductor (CMOS1), may be employed. As the zoom lens system 20, a zoom lens system according to an embodiment of the present invention may be employed. In FIG. 28, the lens units included in the zoom lens system 1 according t the first embodiment, shown in FIG. 1, is simplified and shown as a single lens. The zoom lens system to be employed is not limited to the zoom lens system 1 according to the first embodiment, and, instead, the zoom lens system 2 or 3 according to the second or third embodiment or any other zoom lens systems according to an embodiment of the present invention not described in this specification may be employed.

An electric signal generated by the image-pickup element 30 is sent to an image separation circuit 40. From the image separation circuit 40, a signal for focus control is sent to a control circuit 50 and a signal for image is sent to an image-processing circuit. The signal sent to the image-processing circuit is converted into various signals suitable for the subsequent processing. The converted signals are subjected to various types of processing, such as display by a display apparatus, recording on a recoding medium, or transferring by a communication device.

For example, an operation signal, such as an operation signal of a zoom button, is input to the control circuit 50 from an outside unit, and various types of processing is carried out depending on the operation signal. For example, when a zooming instruction is input by the zoom button, driving units 61, 62, 63, and 64 are operation via a driver circuit 60 so as to set the focal distance on the basis of the instruction, and lens unit G1, G2, G3, and G4 are moved to predetermined positions. Position information of the lens units G1, G2, G3, and G4 obtained by sensors 71, 72, 73, and 74 is input to the control circuit 50 and is referred to when outputting an instruction signal to the driver circuit 60. The control circuit 50 checks the focus condition on the basis of the signal sent from the image separation circuit 40, operates the driving unit 64 via the driver circuit 60 so as to obtain an optimal focus condition, and controls the position of the fourth lens unit G4.

The image-pickup apparatus 10 includes a shake-correction function. For example, when a shake detection unit 80, e.g., a gyro sensor, detects shaking of the image-pickup element caused by pressing the shutter release button, a signal is sent from the shake detection unit 80 to the control circuit 50. At the control circuit 50, a shake-correction angle for compensating for the shaking of the image is calculated. The control circuit 50 operates a driving unit 91 via a driver circuit 90 so as to move a positive subunit L52 of the fifth lens unit G5 on the basis of the calculated shake-correction angle and moves the positive subunit L52 in a direction orthogonal to the optical axis. In other words, the control circuit 50 functions as a shake-control unit, and the driving unit 91 functions as a shake-driving unit. The position of the positive subunit L52 is detected by a sensor 92. The position information of the positive subunit L52 obtained by the sensor 92 is input to the control circuit 50 and is referred to when an instruction signal is sent to the driver circuit 90.

The above-described image-pickup apparatus 10 may be provided as various different specific products. For example, the image-pickup apparatus 10 may be employed as a camera unit of a digital input/output device, such as a digital still camera, digital video camera, a mobile phone having a camera, and a personal digital assistant (PDA) having a camera.

The specific shapes and numerical values indicated in the above-described embodiments and numerical examples are merely provided as examples for realizing the present invention. Therefore, these must not perceived in such a way that limits the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens system comprising:
   a first lens unit having positive refractive power;
   a second lens unit having negative refractive power;
   a third lens unit having positive refractive power;
   a fourth lens unit having positive refractive power; and
   a fifth lens unit,
   wherein,
   the lens units are disposed in this order from an object,
   when the lens positions change from the wide-angle end to the telephoto end, at least the first to fourth lens units are movable in an optical axis direction, the second lens unit moves toward an image and the third lens unit moves toward the object so that the distance between the first lens unit and the second lens unit increases and the distance between the second lens unit and the third lens unit decreases, and the fourth lens moves in the optical axis direction to compensate for a displacement of an image plane due to the movement of the lens units,
   the fifth lens unit includes a negative subunit having negative refractive power and a positive subunit having positive refractive power and being disposed on the image side of the negative subunit with an air gap provided between the negative subunit and the positive subunit, the fifth lens unit being capable of shifting the image by shifting the positive subunit relative to the negative subunit in a direction substantially orthogonal to the optical axis,
   a movable aperture stop is provided closer to the object than the fifth lens unit, wherein the following expression is satisfied:

$0.03 < \Delta S/ft < 0.15$ where $\Delta S$ represents the movement of the aperture stop from the wide-angle end to the telephoto end, in which the movement toward the object is positive, and ft represents the focal length at the telephoto end, and
   wherein the fifth lens unit is fixed in the optical axis direction.

2. The zoom lens system according to claim 1, wherein the following expression is satisfied:

$-1 < (Ra+Rb)/(Ra-Rb) < -0.35$ where Ra represents the radius of curvature of the object side surface of a lens closest to the object and within the positive subunit disposed in the fifth lens unit and Rb represents the radius of curvature of the image side surface of a lens closest to the image and within the positive subunit disposed in the fifth lens unit.

3. The zoom lens system according to claim 1 or 2, wherein an aperture stop is provided in the vicinity of the third lens unit, and
   wherein the following expression is satisfied:

$0.3 < D_{sw}/TL_w < 0.4$ where $D_{sw}$ represents the distance from the aperture stop to the image plane at the telephoto end and $TL_w$ represents the entire length of the zoom lens system at the telephoto end.

4. The zoom lens system according to claim 3, wherein, when the lens positions change, the aperture stop and the third lens unit move together as a unit.

5. The zoom lens system according to claim 1 or 2, wherein the following expression is satisfied:

$0.8 < |f5n|/Dn < 1.3$ where f5n represent the focal length of the negative subunit disposed in the fifth lens unit and Dn represents the distance from the surface of a lens of the negative subunit disposed in the fifth lens unit that is closest to the image to the surface of a lens of the positive subunit disposed in the fifth lens unit that is furthest from the image plus a back focus distance.

6. An image-pickup apparatus comprising:
   a zoom lens system; and
   an image-pickup element configured to convert an optical image formed by the zoom lens system into an electric signal,
   wherein the zoom lens system includes,
   a first lens unit having positive refractive power;
   a second lens unit having negative refractive power;
   a third lens unit having positive refractive power;
   a fourth lens unit having positive refractive power; and
   a fifth lens unit,
   wherein,
   the lens units are disposed in this order from an object,
   when the lens positions change from the wide-angle end to the telephoto end, at least the first to fourth lens units are movable in an optical axis direction, the second lens unit moves toward an image and the third lens unit moves toward the object so that the distance between the first lens unit and the second lens unit increases and the distance between the second lens unit and the third lens unit decreases, and the fourth lens moves in the optical axis direction to compensate for a displacement of an image plane due to the movement of the lens units,
   the fifth lens unit includes a negative subunit having negative refractive power and a positive subunit having positive refractive power and being disposed on the image side of the negative subunit with an air gap provided between the negative subunit and the positive subunit, the fifth lens unit being capable of shifting the image by shifting the positive subunit relative to the negative subunit in a direction substantially orthogonal to the optical axis, a movable aperture stop is provided closer to the object than the fifth lens unit, and the following expression is satisfied:

$$0.03 < \Delta S/ft < 0.15$$

where ΔS represents the movement of the aperture stop from the wide-angle end to the telephoto end, in which the movement toward the object is positive, and ft represents the focal length at the telephoto end, and wherein the fifth lens unit is fixed in the optical axis direction.

7. The image-pickup apparatus according to claim 6, wherein the following expression is satisfied:

$$-1 < (Ra+Rb)/(Ra-Rb) < -0.35$$

where Ra represents the radius of curvature of the object side surface of a lens closest to the object and within the positive subunit disposed in the fifth lens unit and Rb represents the radius of curvature of the image side surface of a lens closest to the image and within the positive subunit disposed in the fifth lens unit.

8. The image-pickup apparatus according to claim 6 or 7, further comprising:

a shake detecting unit configured to detect shaking of the image-pickup element;

a shake control unit configured to calculate a shake-correction angle for correcting image shaking caused by shaking of an the image-pickup element detected by the shake detecting unit and to send a correction signal for shifting the positive subunit in the fifth lens unit in a direction substantially orthogonal to the optical direction by an amount corresponding to the shake-correction angle; and a shake driving unit configured to shift the positive subunit in a direction substantially orthogonal to the optical axis.

9. A zoom lens system comprising:

a first lens unit having positive refractive power;

a second lens unit having negative refractive power;

a third lens unit having positive refractive power;

a fourth lens unit having positive refractive power; and a fifth lens unit, wherein, the lens units are disposed in this order from an object, when the lens positions change from the wide-angle end to the telephoto end, at least the first to fourth lens units are movable in an optical axis direction, the second lens unit moves toward an image and the third lens unit moves toward the object so that the distance between the first lens unit and the second lens unit increases and the distance between the second lens unit and the third lens unit decreases, and the fourth lens moves in the optical axis direction to compensate for a displacement of an image plane due to the movement of the lens units, the fifth lens unit includes a negative subunit having negative refractive power and a positive subunit having positive refractive power and being disposed on the image side of the negative subunit with an air gap provided between the negative subunit and the positive subunit, the fifth lens unit being capable of shifting the image by shifting the positive subunit relative to the negative subunit in a direction substantially orthogonal to the optical axis, and an aperture stop is provided closer to the object than the fifth lens unit, wherein the fifth lens unit is fixed in the optical axis direction.

10. An image-pickup apparatus comprising:

a zoom lens system; and an image-pickup element configured to convert an optical image formed by the zoom lens system into an electric signal, wherein the zoom lens system includes, a first lens unit having positive refractive power;

a second lens unit having negative refractive power;

a third lens unit having positive refractive power;

a fourth lens unit having positive refractive power; and a fifth lens unit, wherein, the lens units are disposed in this order from an object, when the lens positions change from the wide-angle end to the telephoto end, at least the first to fourth lens units are movable in an optical axis direction, the second lens unit moves toward an image and the third lens unit moves toward the object so that the distance between the first lens unit and the second lens unit increases and the distance between the second lens unit and the third lens unit decreases, and the fourth lens moves in the optical axis direction to compensate for a displacement of an image plane due to the movement of the lens units, the fifth lens unit includes a negative subunit having negative refractive power and a positive subunit having positive refractive power and being disposed on the image side of the negative subunit with an air gap provided between the negative subunit and the positive subunit, the fifth lens unit being capable of shifting the image by shifting the positive subunit relative to the negative subunit in a direction substantially orthogonal to the optical axis, and an aperture stop is provided closer to the object than the fifth lens unit, wherein the fifth lens unit is fixed in the optical axis direction.

* * * * *